US010775937B2

(12) United States Patent
Christiansson et al.

(10) Patent No.: US 10,775,937 B2
(45) Date of Patent: Sep. 15, 2020

(54) STYLUS IDENTIFICATION

(71) Applicant: FlatFrog Laboratories AB, Lund (SE)

(72) Inventors: Tomas Christiansson, Torna Hällestad (SE); Mattias Krus, Lund (SE); Kristofer Jacobson, Malmö (SE); David Gillsjö, Malmö (SE)

(73) Assignee: FlatFrog Laboratories AB, Lund (SE)

( * ) Notice: Subject to any disclaimer, the term of this patent is extended or adjusted under 35 U.S.C. 154(b) by 89 days.

(21) Appl. No.: 15/781,690

(22) PCT Filed: Dec. 7, 2016

(86) PCT No.: PCT/SE2016/051229
§ 371 (c)(1),
(2) Date: Jun. 5, 2018

(87) PCT Pub. No.: WO2017/099657
PCT Pub. Date: Jun. 15, 2017

(65) Prior Publication Data
US 2018/0356940 A1 Dec. 13, 2018

(30) Foreign Application Priority Data
Dec. 9, 2015 (SE) .................. 1551614

(51) Int. Cl.
G06F 3/042 (2006.01)
G06F 3/041 (2006.01)
(Continued)

(52) U.S. Cl.
CPC ........ *G06F 3/0428* (2013.01); *G06F 3/03545* (2013.01); *G06F 3/042* (2013.01);
(Continued)

(58) Field of Classification Search
CPC ...... G06F 3/0421; G06F 3/042; G06F 3/0428; G06F 3/0416; G06F 3/03545; G06T 11/005
See application file for complete search history.

(56) References Cited

U.S. PATENT DOCUMENTS 4,916,712 A 4/1990 Bender
5,608,550 A 3/1997 Epstein et al.
(Continued)

FOREIGN PATENT DOCUMENTS

AU 2008 280 952 A1 3/2009
CN 101174191 A 6/2009
(Continued)

OTHER PUBLICATIONS

Extended European Search Report in European Application No. 16873465.5, dated Jun. 25, 2019 in 9 pages.
(Continued)

*Primary Examiner* — David Tung
(74) *Attorney, Agent, or Firm* — Knobbe Martens Olson & Bear, LLP

(57) ABSTRACT

An optical IR touch sensing apparatus configured to determine, based on output signals of light detectors, a light energy value for each light path across a touch surface, and generate a transmission value for each light path based on the light energy value. A processor is then configured to operate an image reconstruction algorithm on at least part of the thus-generated transmission values and determine a position of a touching object on the touch surface, and an attenuation value corresponding to the attenuation of the light resulting from the object touching the touch surface. Using these values, the processor is configured to identify the type of object.

19 Claims, 21 Drawing Sheets

(51) Int. Cl.
*G06T 11/00* (2006.01)
*G06F 3/0354* (2013.01)

(52) U.S. Cl.
CPC .......... *G06F 3/0416* (2013.01); *G06F 3/0421* (2013.01); *G06F 3/04162* (2019.05); *G06F 3/04166* (2019.05); *G06F 3/04186* (2019.05); *G06T 11/005* (2013.01); *G06F 2203/04109* (2013.01)

(56) References Cited

U.S. PATENT DOCUMENTS

| | | | |
|---|---|---|---|
| 6,031,524 A | 2/2000 | Kunert | |
| 6,175,999 B1 | 1/2001 | Sloan et al. | |
| 7,199,932 B2 | 4/2007 | Sugiura | |
| 7,436,443 B2 | 10/2008 | Hirunuma et al. | |
| 7,729,056 B2 | 6/2010 | Hwang et al. | |
| 9,063,614 B2 | 6/2015 | Petterson et al. | |
| 9,201,520 B2 | 12/2015 | Benko et al. | |
| 9,280,237 B2 | 3/2016 | Kukulj | |
| 9,618,682 B2 | 4/2017 | Yoon et al. | |
| 9,874,978 B2 | 1/2018 | Wall | |
| 10,013,107 B2 | 7/2018 | Christiansson et al. | |
| 10,019,113 B2 | 7/2018 | Christiansson et al. | |
| 10,282,035 B2 | 5/2019 | Kocovski et al. | |
| 2009/0000831 A1 | 1/2009 | Miller et al. | |
| 2009/0013562 A1 | 5/2009 | Van De Wijdeven et al. | |
| 2009/0122027 A1 | 5/2009 | Newton | |
| 2010/0073327 A1* | 3/2010 | Mau .................. | G06F 3/042 345/175 |
| 2010/0103133 A1 | 4/2010 | Park et al. | |
| 2011/0084939 A1 | 4/2011 | Gepner et al. | |
| 2011/0210946 A1 | 9/2011 | Goertz et al. | |
| 2012/0062492 A1 | 3/2012 | Katoh | |
| 2012/0146957 A1 | 6/2012 | Dunagan | |
| 2012/0218229 A1 | 8/2012 | Drumm | |
| 2012/0313865 A1 | 12/2012 | Pearce | |
| 2013/0106709 A1 | 5/2013 | Simmons | |
| 2013/0141395 A1 | 6/2013 | Holmgren et al. | |
| 2013/0141397 A1 | 6/2013 | Dunagan | |
| 2013/0181953 A1 | 7/2013 | Hinckley et al. | |
| 2013/0342490 A1* | 12/2013 | Wallander .............. | G06F 3/042 345/173 |
| 2014/0253520 A1 | 9/2014 | Cueto et al. | |
| 2014/0259029 A1 | 9/2014 | Choi et al. | |
| 2015/0009687 A1 | 1/2015 | Lin | |
| 2015/0121691 A1 | 5/2015 | Wang | |
| 2015/0199071 A1* | 7/2015 | Hou .................... | G06F 3/0416 345/175 |
| 2015/0261375 A1 | 9/2015 | Leigh et al. | |
| 2015/0286698 A1 | 10/2015 | Gagnier et al. | |
| 2015/0293600 A1* | 10/2015 | Sears .................. | H04N 13/271 345/156 |
| 2015/0373864 A1 | 12/2015 | Jung | |
| 2016/0004898 A1 | 1/2016 | Holz | |
| 2016/0026297 A1 | 1/2016 | Shinkai et al. | |
| 2016/0062549 A1* | 3/2016 | Drumm ................ | G06F 3/0421 345/175 |
| 2016/0098152 A1 | 4/2016 | Drumm et al. | |
| 2016/0117019 A1 | 4/2016 | Michiaki | |
| 2016/0077616 A1 | 6/2016 | Durojaiye et al. | |
| 2016/0209886 A1 | 7/2016 | Suh et al. | |
| 2016/0255713 A1 | 9/2016 | Kim et al. | |
| 2016/0295711 A1 | 10/2016 | Ryu et al. | |
| 2016/0299583 A1 | 10/2016 | Watanabe | |
| 2017/0293392 A1 | 10/2017 | Christiansson et al. | |
| 2017/0344185 A1 | 11/2017 | Ohlsson et al. | |
| 2018/0031753 A1 | 2/2018 | Craven-Bartle et al. | |
| 2018/0129354 A1 | 5/2018 | Christiansson et al. | |
| 2018/0210572 A1 | 7/2018 | Wallander et al. | |
| 2018/0225006 A1 | 8/2018 | Wall | |
| 2018/0253187 A1 | 9/2018 | Christiansson et al. | |
| 2018/0267672 A1 | 9/2018 | Wassvik et al. | |
| 2018/0275788 A1 | 9/2018 | Christiansson et al. | |
| 2018/0275830 A1 | 9/2018 | Christiansson et al. | |
| 2018/0275831 A1 | 9/2018 | Christiansson et al. | |
| 2019/0050074 A1 | 2/2019 | Kocovski | |

FOREIGN PATENT DOCUMENTS

| | | |
|---|---|---|
| CN | 201465071 U | 5/2010 |
| CN | 101882034 | 11/2010 |
| CN | 203189466 U | 9/2013 |
| CN | 203224848 U | 10/2013 |
| CN | 205015574 U | 2/2016 |
| EP | 2565770 A2 | 3/2013 |
| EP | 2778849 A1 | 9/2014 |
| EP | 2515216 A1 | 3/2016 |
| WO | WO 2008/034184 A1 | 3/2008 |
| WO | WO 2010/064983 | 6/2010 |
| WO | WO 2012/018176 A2 | 2/2012 |
| WO | WO 2013/115710 A2 | 8/2013 |
| WO | WO 2014/086084 A1 | 6/2014 |
| WO | WO 2014/098744 A1 | 6/2014 |
| WO | WO 2014/104967 A1 | 7/2014 |
| WO | WO 2015/175586 A1 | 11/2015 |
| WO | WO 2018/096430 A1 | 5/2018 |
| WO | WO 2018/106172 A1 | 6/2018 |

OTHER PUBLICATIONS

International Search Report for International App. No. PCT/SE2016/051229, dated Mar. 10, 2017, in 4 pages.
Supplementary European Search Report for European App. No. EP 16759213, dated Oct. 4, 2018, in 9 pages.
Extended European Search Report for European App. No. 16743795.3, dated Sep. 11, 2018, in 5 pages.
International Search Report for International App. No. PCT/SE2017/051224, dated Feb. 23, 2018, in 5 pages.
International Search Report for International App. No. PCT/IB2017/057201, dated Mar. 6, 2018, in 4 pages.
Extended European Search Report in European Application No. 19165019.1, dated Jul. 18, 2019 in 8 pages.
International Preliminary Report on Patentability received in International Application No. PCT/SE2017/051233, dated Jun. 11, 2019, in 6 pages.
International Search Report for International App. No. PCT/SE2018/050070, dated Apr. 25, 2018, in 4 pages.
Extended European Search Report in European Application No. 17750516.1, dated Jul. 16, 2019 in 5 pages.

* cited by examiner

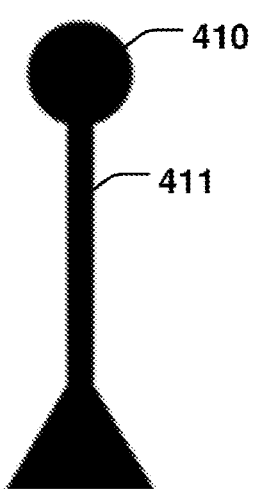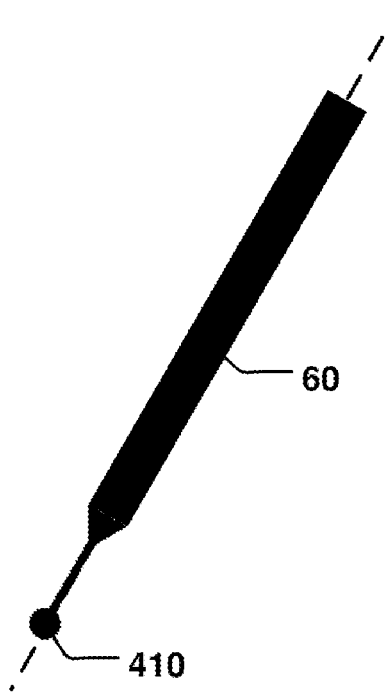
Figure 31a　　　　　　Figure 31b
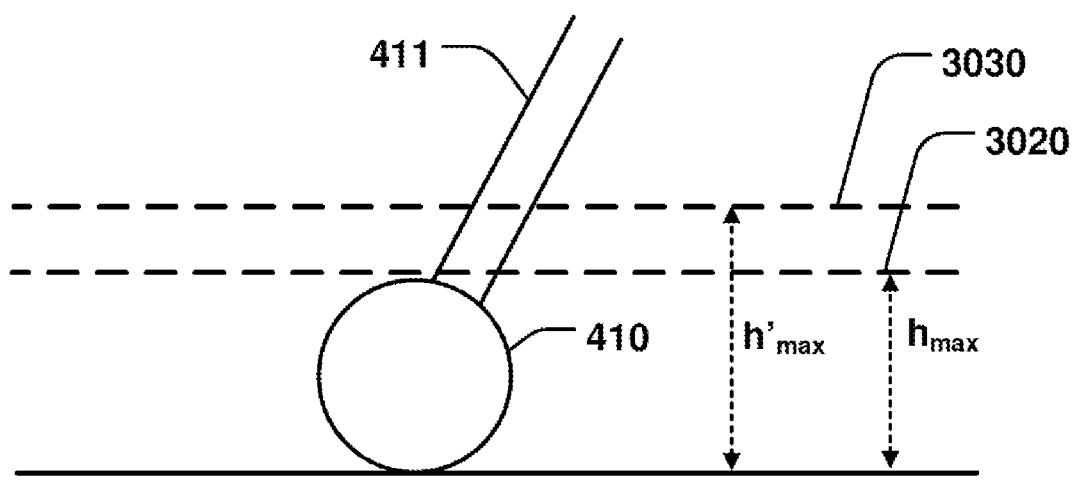
Figure 31c

STYLUS IDENTIFICATION

TECHNICAL FIELD

The present invention relates to techniques for detecting and identifying objects on a touch surface.

BACKGROUND ART

To an increasing extent, touch-sensitive panels are being used for providing input data to computers, electronic measurement and test equipment, gaming devices, etc. The panel may be provided with a graphical user interface (GUI) for a user to interact with using e.g. a pointer, stylus or one or more fingers. The GUI may be fixed or dynamic. A fixed GUI may e.g. be in the form of printed matter placed over, under or inside the panel. A dynamic GUI can be provided by a display screen integrated with, or placed underneath, the panel or by an image being projected onto the panel by a projector.

There are numerous known techniques for providing touch sensitivity to the panel, e.g. by using cameras to capture light scattered off the point(s) of touch on the panel, by using cameras to directly observe the objects interacting with the panel, by incorporating resistive wire grids, capacitive sensors, strain gauges, etc. into the panel.

In one category of touch-sensitive panels known as 'above surface optical touch systems' and known from e.g. U.S. Pat. No. 4,459,476, a plurality of optical emitters and optical receivers are arranged around the periphery of a touch surface to create a grid of intersecting light paths above the touch surface. Each light path extends between a respective emitter/receiver pair. An object that touches the touch surface will block or attenuate some of the light paths. Based on the identity of the receivers detecting a blocked light path, a processor can determine the location of the intercept between the blocked light paths.

US patent publication 2004/0252091 discloses an alternative technique which is based on frustrated total internal reflection (FTIR). Light is coupled into a panel to propagate inside the panel by total internal reflection. Arrays of light sensors are located around the perimeter of the panel to detect the light. When an object comes into contact with a surface of the panel, the light will be locally attenuated at the point of touch. The location of the object is determined by triangulation based on the attenuation of the light from each source at the array of light sensors.

For most touch systems, a user may place a finger onto the surface of a touch panel in order to register a touch. Alternatively, a stylus may be used. A stylus is typically a pen shaped object with one end configured to be pressed against the surface of the touch panel. An example of a stylus according to the prior art is shown in FIG. 3. Use of a stylus 60 may provide improved selection accuracy and pointer precision over a simple finger touch. This can be due to the engineered stylus tip 160 providing a smaller and/or more regular contact surface with the touch panel than is possible with a human finger. Also, muscular control of an entire hand in a pen holding position can be more precise than a single finger for the purposes of pointer control due to lifelong training in the use of pens and pencils.

Two types of stylus exist for touch systems. An active stylus is a stylus typically comprising some form of power source and electronics to transmit a signal to the host touch system. The type of signal transmitted can vary but may include position information, pressure information, tilt information, stylus ID, stylus type, ink colour etc. The source of power for an active stylus may include a battery, capacitor, or an electrical field for providing power via inductive coupling. Without power, an active stylus may lose some or all of its functionality.

An active stylus may be readily identified by a host system by receiving an electronic stylus ID from the active stylus and associating the stylus ID with position information relating to the contact position between the stylus and the touch surface of the host system.

A passive stylus has no power source and does not actively communicate with the host system. Therefore, a passive stylus is cheaper to manufacture than an active stylus and does not require maintenance. However, advanced information like application pressure, tilt information, stylus ID, stylus type, ink colour etc. can be significantly more difficult to obtain from a passive stylus than from an active stylus.

U.S. Pat. No. 6,567,078 describes a method of marking a plurality of passive styluses with one or more colour films in a pattern unique to each stylus. A camera is arranged to record the colour markings on the stylus and identify the passive stylus in use in order to determine the appropriate choice of ink colour to be displayed on the screen.

For optical touch systems such as those described in US patent publication 2004/0252091 and U.S. Pat. No. 4,459,476, it can be difficult to identify an object with a tip as small as a stylus. In particular, stylus tips are typically small (i.e. smaller than 4 mm in diameter) and provide a relatively small amount of attenuation of the light signals compared with a finger or other large object. The stylus tip may also have a smaller diameter than the resolution of the touch system is able to resolve.

Furthermore, the low signal-to-noise of such systems makes identification of each of a plurality of passive styluses using unique retro-reflective material arrangements difficult and unreliable.

Therefore, what is needed is a way of identifying objects touching an optical touch system which does not suffer from the above problem.

SUMMARY

It is an objective of the invention to at least partly overcome one or more of the above-identified limitations of the prior art.

One or more of these objectives, as well as further objectives that may appear from the description below, are at least partly achieved by means of a method for data processing, a computer readable medium, devices for data processing, and a touch-sensing apparatus according to the independent claims, embodiments thereof being defined by the dependent claims.

BRIEF DESCRIPTION OF DRAWINGS

Embodiments of the invention will now be described in more detail with reference to the accompanying schematic drawings.

FIGS. 31a-c show a stylus tip having a spherically-shaped portion.

DETAILED DESCRIPTION OF EMBODIMENTS

Figure 1:
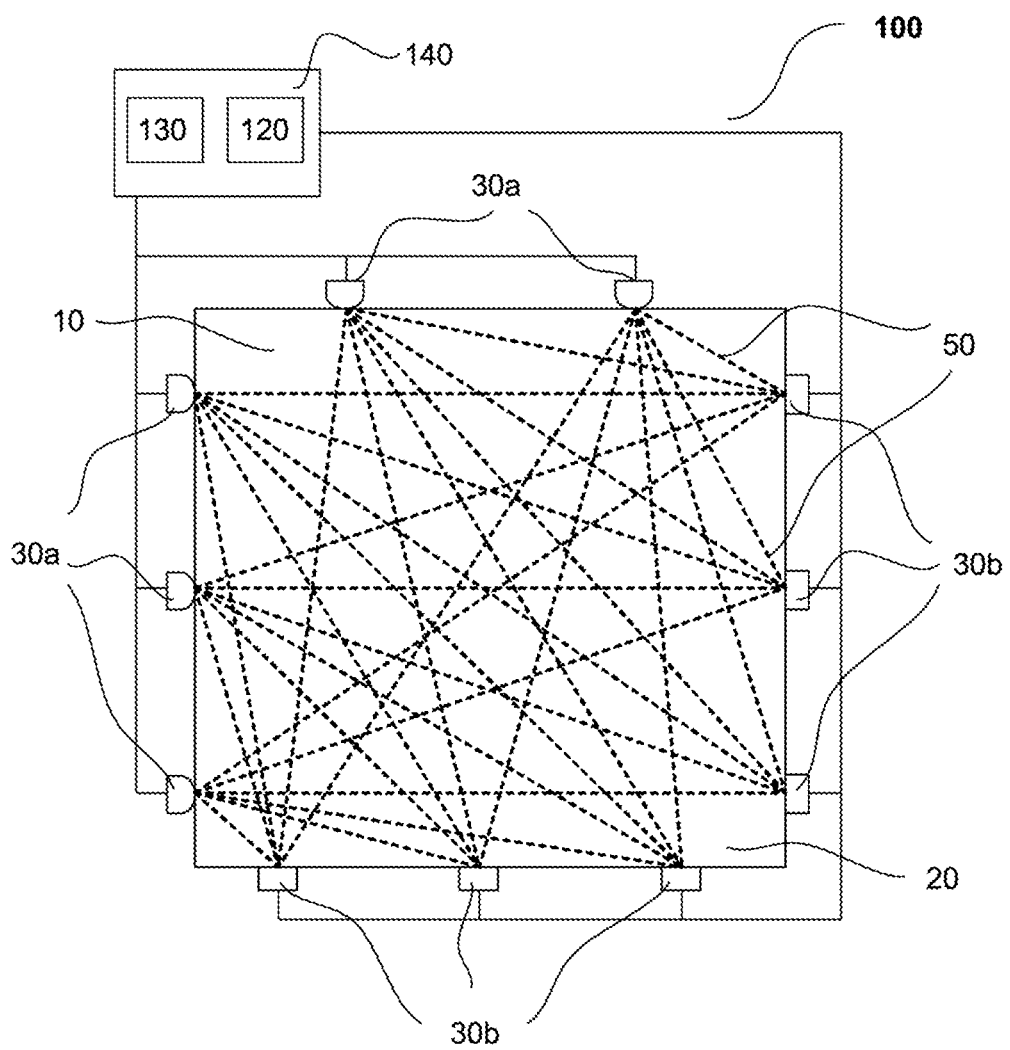
FIG. 1 is a top plan view of an optical touch apparatus.

The present invention relates to optical touch panels and the use of techniques for providing touch sensitivity to a display apparatus. Throughout the description the same reference numerals are used to identify corresponding elements.

Before describing embodiments of the invention, a few definitions will be given.

A "touch object" or "touching object" is a physical object that touches, or is brought in sufficient proximity to, a touch surface so as to be detected by one or more sensors in the touch system. The physical object may be animate or inanimate.

An "interaction" occurs when the touch object affects a parameter measured by the sensor.

A "touch" denotes a point of interaction as seen in the interaction pattern. Throughout the following description, the same reference numerals are used to identify corresponding elements.

A "light field" is the light flowing between an emitter and a corresponding detector. Although an emitter may generate a large amount of light in many directions, only the light measured by a detector from an emitter defines the light field for the emitter and detector.

Figure 2:
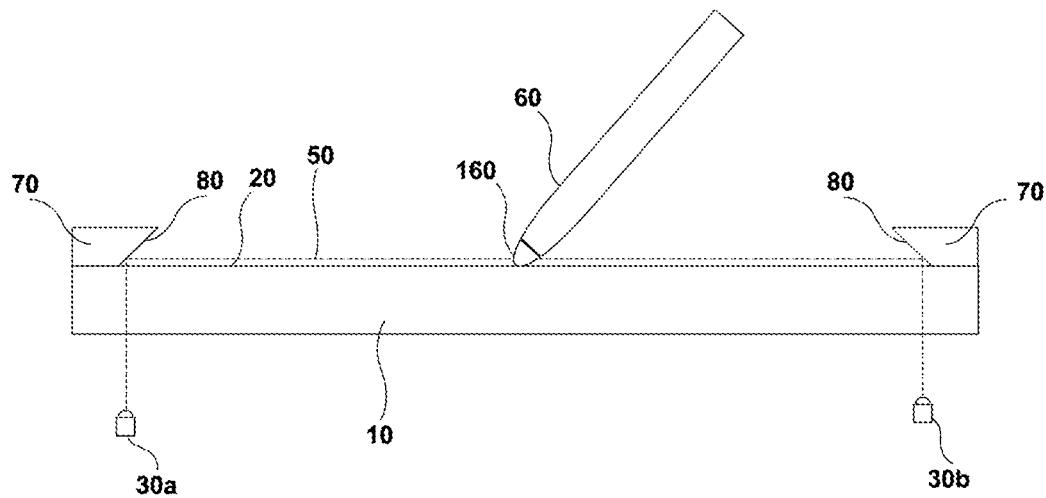
FIG. 2 shows a cross-section of an IR optical touch apparatus according to the prior art.
Figure 3:
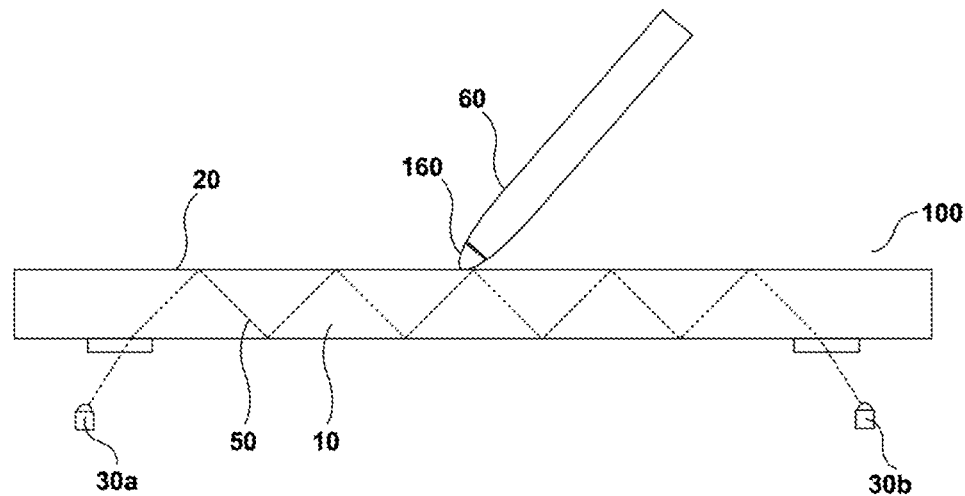
FIG. 3 shows a cross-section of an FTIR-based touch apparatus according to the prior art.

FIG. 1 is a top plan view of an optical touch apparatus which may correspond to the FTIR-based touch apparatus of FIG. 3 or the IR optical touch apparatus of FIG. 2. Emitters 30a are distributed around the periphery of touch surface 20, to project light across the touch surface 20 of touch panel 10. Detectors 30b are distributed around the periphery of touch surface 20, to receive part of the propagating light. The light from each of emitters 30a will thereby propagate to a number of different detectors 30b on a plurality of light paths 50.

FIG. 3 shows a cross-section of an FTIR-based touch apparatus according to the prior art and herein referred to as an 'in-glass' system. FIG. 2 shows a cross-section of an IR optical touch apparatus according to the prior art and herein referred to as an 'above-surface' system. In each of the example apparatus shown in FIGS. 3 and 2, object 60 will attenuate light propagating along at least one light path 50. In the example shown of FIG. 2, object 60 may even fully occlude the light on at least one light path 50.

Light paths 50 may conceptually be represented as "detection lines" that extend across the touch surface 20 to the periphery of touch surface 20 between pairs of emitters 30a and detectors 30b, as shown in FIG. 1. Thus, the detection lines 50 correspond to a projection of the light paths 50 onto the touch surface 20. Thereby, the emitters 30a and detectors 30b collectively define a grid of detection lines 50 ("detection grid") on the touch surface 20, as seen in a top plan view. The spacing of intersections in the detection grid defines the spatial resolution of the touch-sensitive apparatus 100, i.e. the smallest object that can be detected on the touch surface 20. The width of the detection line is a function of the width of the emitters and corresponding detectors. A wide detector detecting light from a wide emitter provides a wide detection line with a broader surface coverage, minimising the space in between detection lines which provide no touch coverage. A disadvantage of broad detection lines may be the reduced touch precision and lower signal to noise ratio.

As used herein, the emitters 30a may be any type of device capable of emitting radiation in a desired wavelength range, for example a diode laser, a VCSEL (vertical-cavity surface-emitting laser), an LED (light-emitting diode), an incandescent lamp, a halogen lamp, etc. The emitters 30a may also be formed by the end of an optical fibre. The emitters 30a may generate light in any wavelength range. The following examples presume that the light is generated in the infrared (IR), i.e. at wavelengths above about 750 nm. Analogously, the detectors 30b may be any device capable of converting light (in the same wavelength range) into an electrical signal, such as a photo-detector, a CCD device, a CMOS device, etc.

The detectors 30b collectively provide an output signal, which is received and sampled by a signal processor 130. The output signal contains a number of sub-signals, also denoted "transmission values", each representing the energy of light received by one of light detectors 30b from one of light emitters 30a. Depending on implementation, the signal processor 130 may need to process the output signal for separation of the individual transmission values. The transmission values represent the received energy, intensity or power of light received by the detectors 30b on the individual detection lines 50. Whenever an object touches a detection line 50, the received energy on this detection line is decreased or "attenuated". Where an object blocks the entire width of the detection line of an above-surface system, the detection line will be fully attenuated or occluded.

In the preferred embodiment, the touch apparatus is arranged according to FIG. 2. A light emitted by emitters 30a is transmitted through transmissive panel 10 in a manner that does not cause the light to TIR within transmissive panel 10. Instead, the light exits transmissive panel 10 through touch surface 20 and is reflected by reflector surface 80 of edge reflector 70 to travel along a path 50 in a plane parallel with touch surface 20. The light will then continue until deflected by reflector surface 80 of the edge reflector 70 at an opposing edge of the transmissive panel 10, wherein the light will be deflected back down through transmissive panel 10 and onto detectors 30b. An object 60 (optionally having object tip 160) touching surface 20 will occlude light paths 50 that intersect with the location of the object on the surface resulting in an attenuated light signal received at detector 30b.

Figure 4:
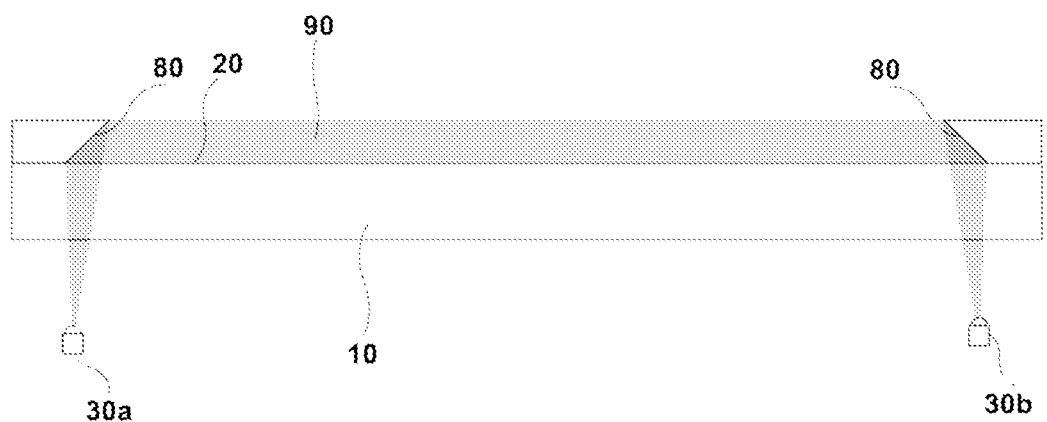
FIG. 4 shows a light field of an IR optical touch apparatus.

FIG. 4 shows the manner in which light travelling from emitters 30a to detectors 30b will form a light field 90 between reflector surfaces 80. In the preferred embodiment, the top edge of reflector surface 80 is 2 mm above touch surface 20. This results in a light field 90 which is 2 mm deep. A 2 mm deep field is advantageous for this embodiment as it minimizes the distance that the object needs to travel into the light field to reach the touch surface and to maximally attenuate the light. The smaller the distance, the shorter time between the object entering the light field and contacting the surface. This is particularly advantageous for differentiating between large objects entering the light field slowly and small objects entering the light field quickly. A large object entering the light field will initially cause a similar attenuation as a smaller object fully extended into the light field. The shorter distance for the objects to travel, the fewer frames are required before a representative attenuation signal for each object can be observed. This effect is particularly apparent when the light field is between 0.5 mm and 2 mm deep.

The arrangement shown in FIG. 3 is an alternative embodiment but the concepts of stylus differentiation described below are similarly applied. The apparatus operates by transmitting light inside a transmissive panel 10, from light emitters 30a to light sensors or detectors 30b, so as to illuminate a touch surface 20 from within the transmissive panel 10. The transmissive panel 10 is made of solid material in one or more layers and may have any shape. The transmissive panel 10 defines an internal radiation propagation channel, in which light propagates by internal reflections along paths 50. An object touching the surface of the transmissive panel 10 causes frustration of the internal reflection effect at the location of the touch and a portion of the light travelling through the panel via total internal reflection is scattered or absorbed by the object. In this way, light beams travelling through the panel are attenuated at the position of the touch.

Unless otherwise stated, the embodiments described in the specification apply to the arrangement shown in FIG. 2. However, some of these embodiments may also be applied to an arrangement shown in FIG. 3.

The signal processor 130 may be configured to process the transmission values so as to determine a property of the touching objects, such as a position (e.g. in a x,y coordinate system), a shape, or an area. This determination may involve a straight-forward triangulation based on the attenuated detection lines, e.g. as disclosed in U.S. Pat. No. 7,432,893 and WO2010/015408, or a more advanced processing to recreate a distribution of attenuation values (for simplicity, referred to as an "attenuation pattern") across the touch surface 20, where each attenuation value represents a local degree of light attenuation. The attenuation pattern may be further processed by the signal processor 130 or by a separate device (not shown) for determination of a position, shape or area of touching objects. The attenuation pattern may be generated e.g. by any available algorithm for image reconstruction based on transmission values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962, WO2011/049511, WO2011/139213, WO2012/050510, and WO2013/062471, all of which are incorporated herein by reference.

For the purposes of brevity, the term 'signal processor' is used throughout to describe one or more processing components for performing the various stages of processing required between receiving the signal from the detectors through to outputting a determination of touch including touch co-ordinates, touch properties, etc. Although the processing stages of the present disclosure may be carried out on a single processing unit (with a corresponding memory unit), the disclosure is also intended to cover multiple processing units and even remotely located processing units.

In the illustrated example, the apparatus 100 also includes a controller 120 which is connected to selectively control the activation of the emitters 30a and, possibly, the readout of data from the detectors 30b. Depending on implementation, the emitters 30a and/or detectors 30b may be activated in sequence or concurrently, e.g. as disclosed in U.S. Pat. No. 8,581,884. The signal processor 130 and the controller 120 may be configured as separate units, or they may be incorporated in a single unit. One or both of the signal processor 130 and the controller 120 may be at least partially implemented by software executed by a processing unit 140.

Figure 5:
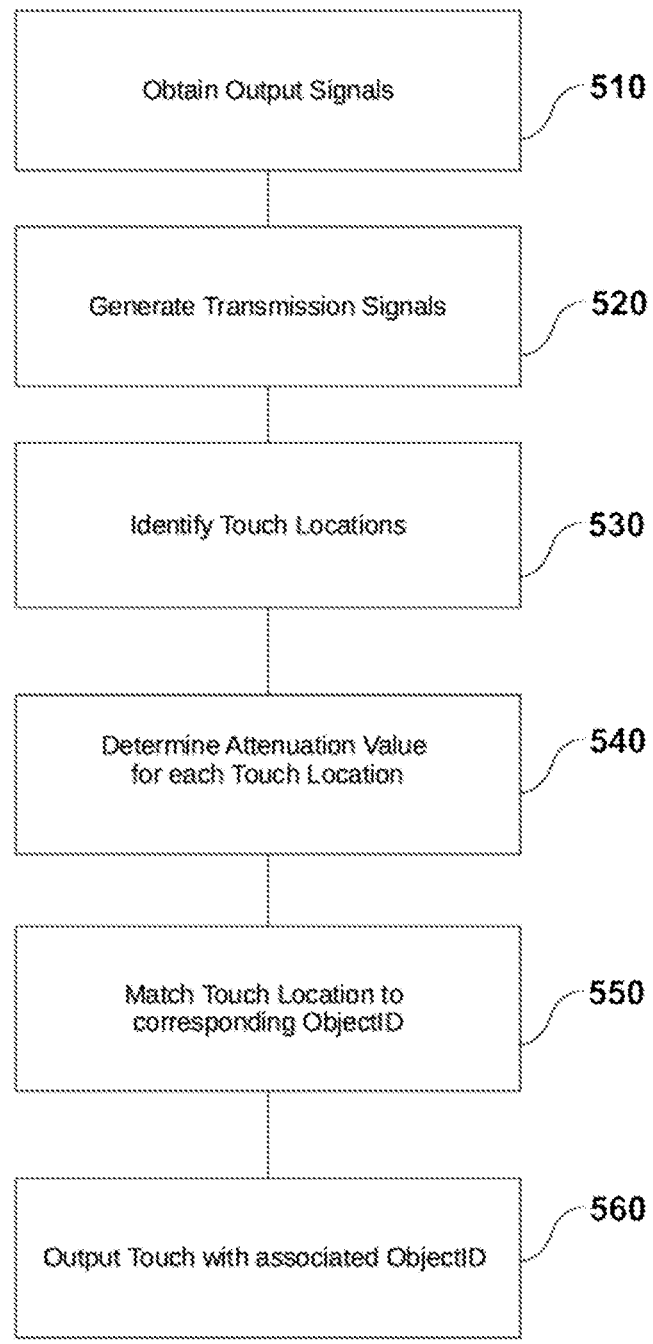
FIG. 5 is a flow chart showing a touch determination process.

FIG. 5 shows a flow diagram according to a preferred embodiment.

In step 510 of FIG. 5, the signal processor 130 receives and samples output signals from detectors 30b.

In step 520, the output signals are processed for determination of the transmission values (or 'transmission signals'). As described above, the transmission values represent the received energy, intensity or power of light received by the detectors 30b on the individual detection lines 50.

In step 530, the signal processor 130 is configured to process the transmission values to determine the presence of one or more touching objects on the touch surface. In the preferred embodiment, the signal processor 130 is configured to process the transmission values to generate a two-dimensional estimation of the attenuation field across the touch surface, i.e. a spatial distribution of attenuation values, in which each touching object typically appears as a region of changed attenuation. From the attenuation field, two-dimensional touch data may be extracted and one or more touch locations may be identified. The transmission values may be processed according to a tomographic reconstruction algorithm to generate the two-dimensional estimation of the attenuation field.

In one embodiment, the signal processor 130 maybe configured to generate an attenuation field for the entire touch surface. In an alternative embodiment, the signal processor 130 maybe configured to generate an attenuation field for a sub-section of the touch surface, the sub-section being selected according to one or more criteria determined during processing of the transmission values.

In step 540, the signal processor 130 determines properties of the object at each touch location, including an attenuation value corresponding to the attenuation of the beams of light resulting from the object touching the touch surface.

In one embodiment, the attenuation value is determined in the following manner: First, the attenuation pattern is processed for detection of peaks, e.g. using any known technique. In one embodiment, a global or local threshold is first applied to the attenuation pattern, to suppress noise. Any areas with attenuation values that fall above the threshold may be further processed to find local maxima. The identified maxima may be further processed for determination of a touch shape and a center position, e.g. by fitting a two-dimensional second-order polynomial or a Gaussian bell shape to the attenuation values, or by finding the ellipse of inertia of the attenuation values. There are also numerous other techniques as is well known in the art, such as clustering algorithms, edge detection algorithms, standard blob detection, water shedding techniques, flood fill techniques, etc. Step 540 results in a collection of peak data, which may include values of position, attenuation, size, and shape for each detected peak. The attenuation value may be calculated from a maximum attenuation value or a weighted sum of attenuation values within the peak shape.

Figure 6:
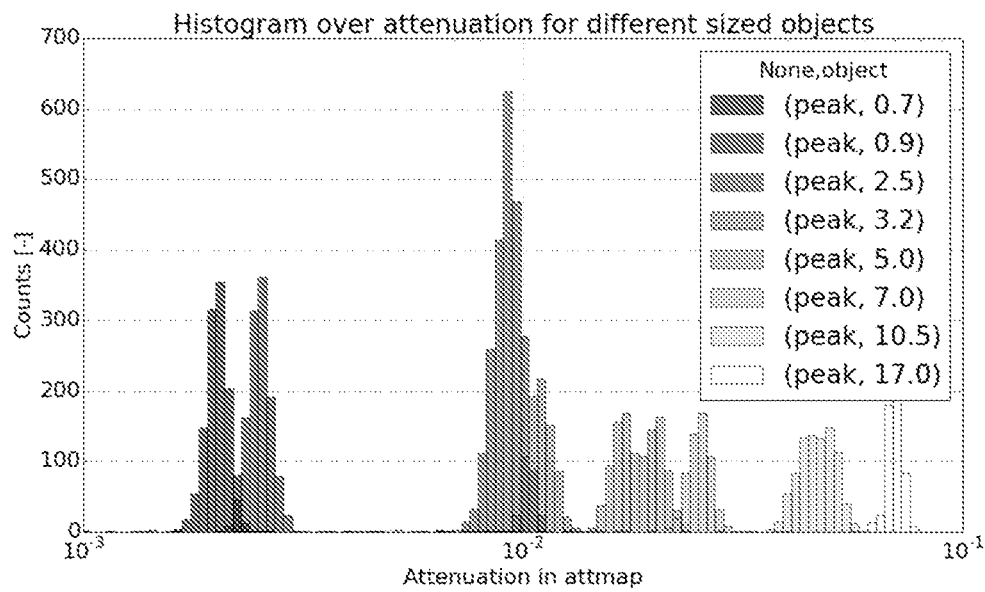
FIG. 6 is a histogram showing measured attenuation of light beams from eight unique objects applied to the touch surface.

The attenuation value recorded for an object may vary due to noise, object angle, object material, or a number of other reasons. FIG. 6 is a histogram showing a count of attenuation values for each of eight unique objects applied to the touch surface. Each object demonstrates a roughly bell-shaped distribution of frequency of recorded attenuation values. It is clear from FIG. 6 that it is possible to differentiate between different object from recorded attenuation values, particularly where multiple attenuation values for each object are recorded.

Figure 7:
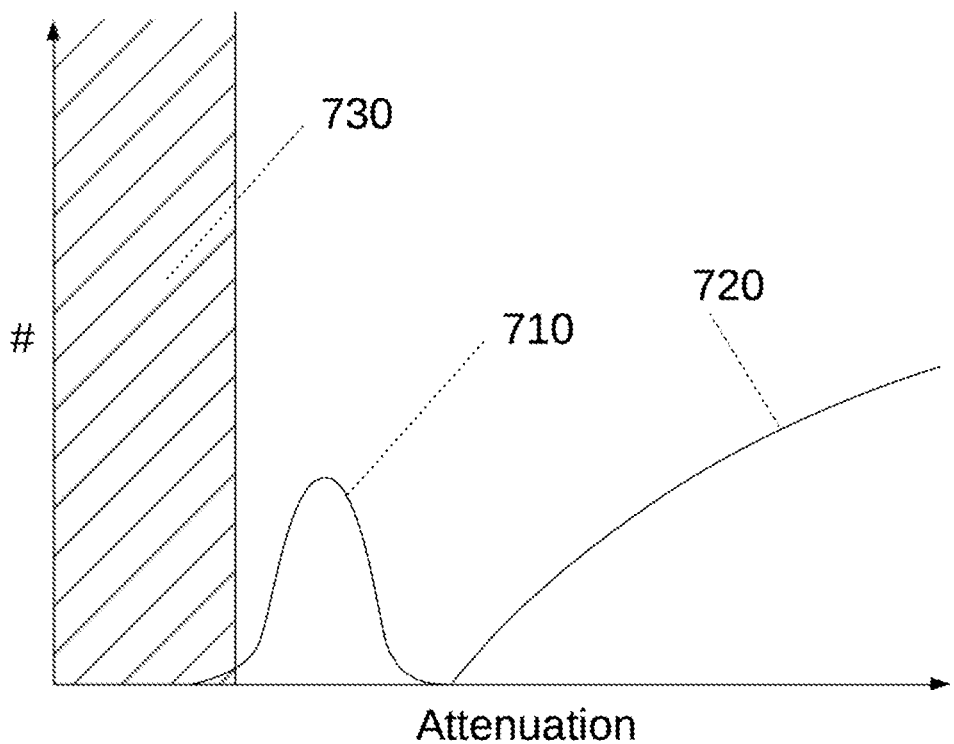
FIG. 7 is a histogram showing measured attenuation of light beams from two objects applied to the touch surface, a stylus and a finger.
Figure 8:
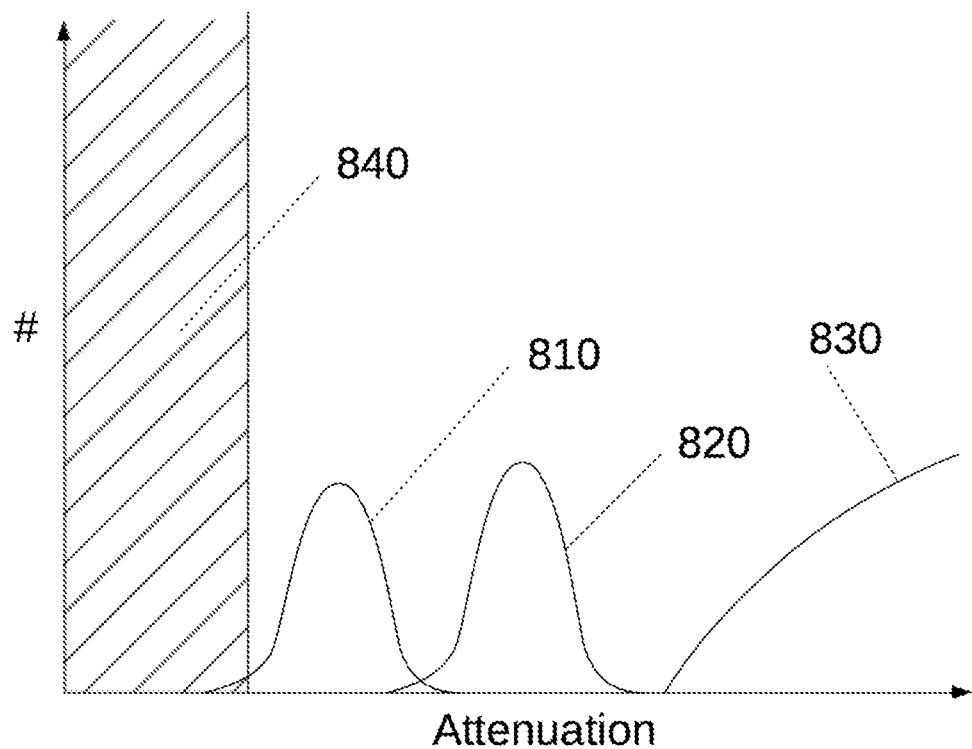
FIG. 8 is a histogram showing measured attenuation of light beams from three objects applied to the touch surface, a first stylus, a second stylus, and a finger.

Certain objects may provide a wider distribution of attenuation values than others. FIG. 7 is a histogram showing measured attenuation of light beams from two objects applied to the touch surface, a stylus and a finger. Bell-shaped distribution of values 710 represents attenuation values for a specially designed stylus tip applied to the touch surface. Distribution 720 represents attenuation values for a population of different fingers applied to the touch surface. As people have different sized fingers and some fingers may be more oily that others, the range of possible attenuation values from objects in distribution 720 is much wider than the possible attenuation values for a specially designed stylus tip. Zone 730 represents attenuation values which are too small for the system to reliably record. In a typical example, zone 730 covers attenuation values smaller than $1.8*10^{-3}$ (Note: All attenuation values described in the present specification have units of $mm^{-1}$ but it is understood that attenuation may be measured in a number of different ways.) Depending on the touch resolution of the system, this may translate to objects smaller than 0.5 mm. Therefore, a preferred embodiment of the invention comprises a stylus tip configured to provide attenuation values in a range greater than values in zone 730 but smaller than the range of attenuation values occupied by distribution 720. E.g. $1.8*10^{-3} < $ stylus tip attenuation $< 2.0*10^{-2}$ FIG. 8 is a histogram showing measured attenuation of light beams from three objects applied to the touch surface, a first stylus, a second stylus, and a finger. An object 60 touching the touch surface in the examples of this disclosure may thus be a stylus, or a plurality of styluses, or parts of a human hand such as a finger or plurality of fingers. As in FIG. 7, bell-shaped distribution of values 810 represents attenuation values for a first specially designed stylus tip applied to the touch surface. Distribution 830 represents attenuation values for a finger applied to the touch surface. Zone 840 represents attenuation values which are too small for the system to reliably record. Bell-shaped distribution of values 820 represents attenuation values for a second specially designed stylus tip applied to the touch surface. Therefore, another embodiment of the invention comprises a first stylus tip configured to provide attenuation values in a range greater than values in zone 840 but smaller than the range of attenuation values 820 occupied by a second stylus tip. The second stylus tip is configured to provide attenuation values in a range greater than values occupied by distribution 810 but smaller than the range of attenuation values occupied by distribution 830. E.g. $1.8*10^{-3}<$first stylus tip attenuation$<7.2*10^{-3}<$second stylus tip attenuation$<2.0*10^{-2}$ In the preferred embodiment, signal processor 130 is configured to store a plurality of object IDs in memory, each object ID having an associated attenuation value range. In the following example, three object types with associated Object IDs are shown.

| Object ID: | 001 | 002 | 003 |
|---|---|---|---|
| Object type: | Stylus Thick | Stylus Thin | Finger |
| Output type: | Think Blue Ink | Thick Red Ink | Thick Black Ink |
| Attenuation Max: | $2.0 * 10^{-2}$ | $7.2 * 10^{-3}$ | |
| Attenuation Min: | $7.2 * 10^{-3}$ | $1.8 * 10^{-3}$ | $2.0 * 10^{-2}$ |

In the preferred embodiment, each Object ID has an attenuation value range, defined by an Attenuation Max value and an Attenuation Min value. The Object IDs may optionally comprise further values defining properties of an associated object, including a recognised object type, an output type (e.g. a brush type, ink colour, selection type, etc.)

In step 550, signal processor 130 matches each touch location to an Object ID. This is done by matching the attenuation value of each touch location to the range of the matching Object ID. i.e. A touch location with an attenuation value of $1.2 * 10^{-2}$ will be matched to Object ID 001. In one embodiment, an Object ID exists with a range for all values above a specific value. This allows all objects with an attenuation value above the usual ranges of the Object IDs to be identified using the same 'default large object' Object ID. Similarly, in one embodiment, an Object ID exists with a range for all values below a specific value allowing very low attenuation value objects to be identified with a generic 'default small object' Object ID.

In step 560, signal processor 130 outputs the touch data, including the touch locations and corresponding Object IDs for each location.

When matching an attenuation value of a touch to an object ID, it is important to use a stable attenuation value which correctly reflects the attenuation of the light caused by the object once it is in contact with the surface. In an 'above surface' system such as the embodiment shown in FIG. 2, light field 90 has a depth and so the object must travel a distance through the light field before contacting the touch surface. Consequently, a period of time between when the object enters the light field and when the object contacts the touch surface exists when the attenuation caused by the object is likely to be increasing. Any attenuation values measured during this period will likely not accurately reflect the light attenuation of the object once it is contacting the touch surface. In one embodiment of the invention, step 540 is delayed until an attenuation value of an object is determined to be stable. In one embodiment, the attenuation value of an object is determined to be stable once it has not changed greater than 10% each frame for at least three frames.

Figure 9:
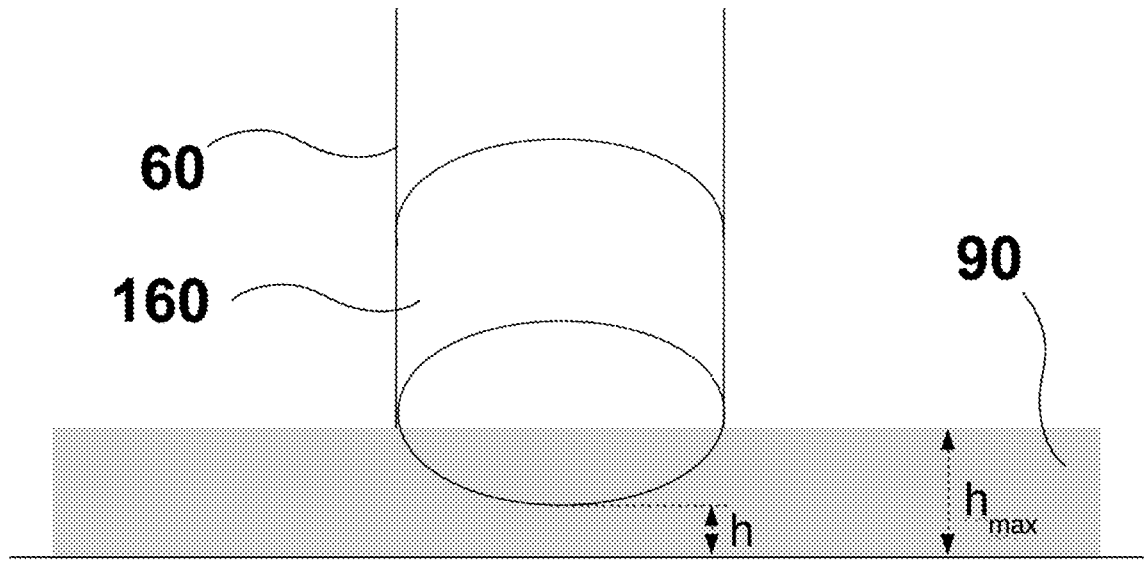
FIG. 9 shows an object entering a light field.
Figure 10:
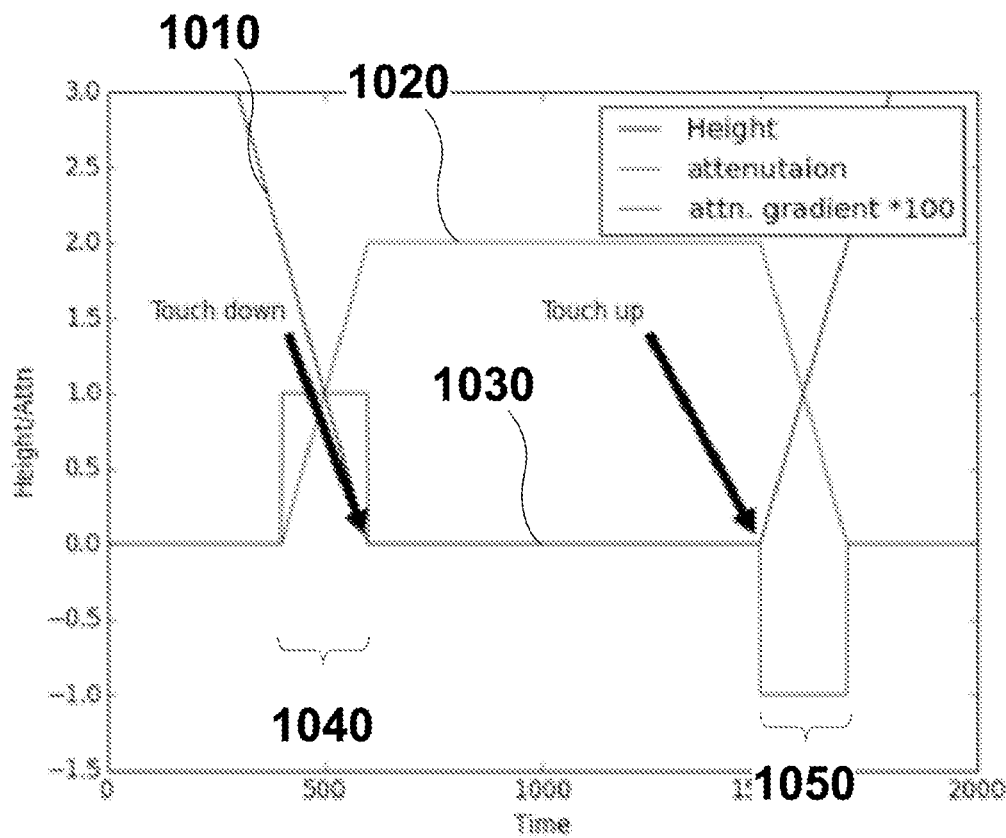
FIG. 10 shows an attenuation value of an object during a 'touch down' and a 'touch up' event.

As an object is lowered into the light field, it occludes increasingly more light. As a consequence, the attenuation of light caused by the object increases until the object has hit the touch surface. The gradient of attenuation (i.e. the rate of change of the attenuation) is therefore positive as the object travels towards the touch surface until it flattens out when the object is in contact with the surface. FIG. 9 shows an object 60 with tip 160 having travelled into light field 90 for a distance of $h_{max}$-h. FIG. 10 shows an attenuation value 1020 of an object during a 'touch down' event 1040 (i.e the application of a touching object to the touch surface) and a 'touch up' event 1050 (i.e lifting the touching object off and away from the touch surface). A corresponding height h (shown as line 1010) of the object from the touch surface is also shown. The line 1030 showing the attenuation gradient (i.e. the rate of change of change of the attenuation value with respect to time) shows a typical attenuation gradient signature for both touch down and touch up events. An attenuation gradient signature is the shape of the attenuation gradient values during a touch down or touch up event.

Therefore, in a preferred embodiment of the invention, signal processor 130 is configured to determine that an object attenuation value is stable and/or that a touch down event has occurred in dependence on an attenuation gradient signature (shown at time 1040 in FIG. 10) of an event. In a preferred embodiment, the attenuation gradient signature corresponding to a touch down event is a first period of a first attenuation gradient, a second period of higher attenuation gradient, and a third period of attenuation gradient lower than the second period.

In one embodiment, a touch down event determined to have occurred once object attenuation value has exceeded a first attenuation value threshold. However, a determination that a touch down event has occurred is possible before this threshold is met, using the above method. Where the object attenuation value is below the first attenuation value threshold but an attenuation gradient signature is observed having a higher attenuation gradient equal to or greater than 20% of the first attenuation value threshold over a single frame, the object attenuation value may be determined to be stable and/or that a touch down event has occurred.

During a 'touch up' event, an attenuation value of the object decreases as the object is lifted out of the light field. Similarly to the above, the attenuation gradient signature of this event (shown at time 1050 in FIG. 10) can be recognized and actioned accordingly. Therefore, in a preferred embodiment of the invention, signal processor 130 is configured to determine that an object attenuation value is reduced to zero and/or that a touch up event has occurred in dependence on an attenuation gradient signature of an event. In a preferred embodiment, the attenuation gradient signature corresponding to a touch up event is a first period of a first attenuation gradient, a second period of negative attenuation gradient, and a third period of attenuation corresponding to the first attenuation gradient.

In one embodiment, a touch up event is determined to have occurred once the object attenuation value is determined to have dropped below a second attenuation value threshold. However, a determination that a touch up event has occurred is possible before this threshold is met, using the above method. Where the object attenuation value is above the second attenuation value threshold but an attenuation gradient signature is observed having a negative attenuation gradient equal to or greater than 20% of the second attenuation value threshold over a single frame, a touch up event may be determined to have occurred.

In a preferred embodiment, the attenuation gradient values required to trigger touch up/down events for an object may be scaled in dependence on the presence of other occluding objects in close proximity to the object. In a preferred example, the attenuation gradient of the second period of a signature is scaled up to require an even larger value to trigger a touch down event for an object in close proximity to other occluding objects on the touch surface. In one embodiment, the higher attenuation gradient is scaled linearly occurred to the number of additional touches within a radius of up to 10 cm. The radius may be chosen in dependence on the screen size, touch resolution, and environmental noise.

'Hooks' are a problem observed in the flow of co-ordinates of user touch input over time when the user is providing rapidly changing touch input. E.g. When drawing or writing. An example of a 'hook' is where the user finishes drawing a stroke, lifts the touch object from the surface of the panel and rapidly changes the direction of movement of the touching object to begin drawing the next stroke. The 'hook' is a small artifact seen at the end of the stroke pointing in the new direction of the user's touch object. A method of minimizing hooks is proposed. In a preferred embodiment of the invention, once a negative attenuation gradient has been observed, the touch coordinates will not be updated with the object's position and the coordinates of the object's position are stored. If the object attenuation value drops below a threshold value, the stored coordinates are discarded and a 'touch up' event is signaled. If the object attenuation value does not drop below a threshold value and a positive attenuation gradient is subsequently observed, the stored touch coordinates for the intervening period will be output and the touch coordinates will continue to be output as before. In a preferred embodiment, the method is only used when the direction of movement of the object contacting the touch surface in the plane of the touch surface is changing. In this embodiment, a vector a from a last touch coordinate of the object to a current coordinate is determined. A second vector p from a touch coordinate previous to the last coordinate to the last coordinate is determined. Vectors a and p allow a determination of the direction the interaction is moving and how it is changing. A rapid change of direction of the object may result in α scalarproduct β<0. In one embodiment, if this condition is met, it may be determined that the direction of movement of the object contacting the touch surface has significantly changed and the above method for minimizing hooks is then applied.

Although the attenuation value of an object provides information regarding the light attenuated by the object touching the surface, some embodiments of the invention require that the attenuation value be compensated in order to provide a true reflection of the nature and/or position of the object.

In one embodiment of the invention, the attenuation value is determined in dependence on the attenuation of the light resulting from the object touching the touch surface and a compensation value. The attenuation value is determined as in step 540 above but wherein the attenuation value is calculated from the compensation value and a maximum attenuation value or a weighted sum of attenuation values within the peak shape.

Figure 11:
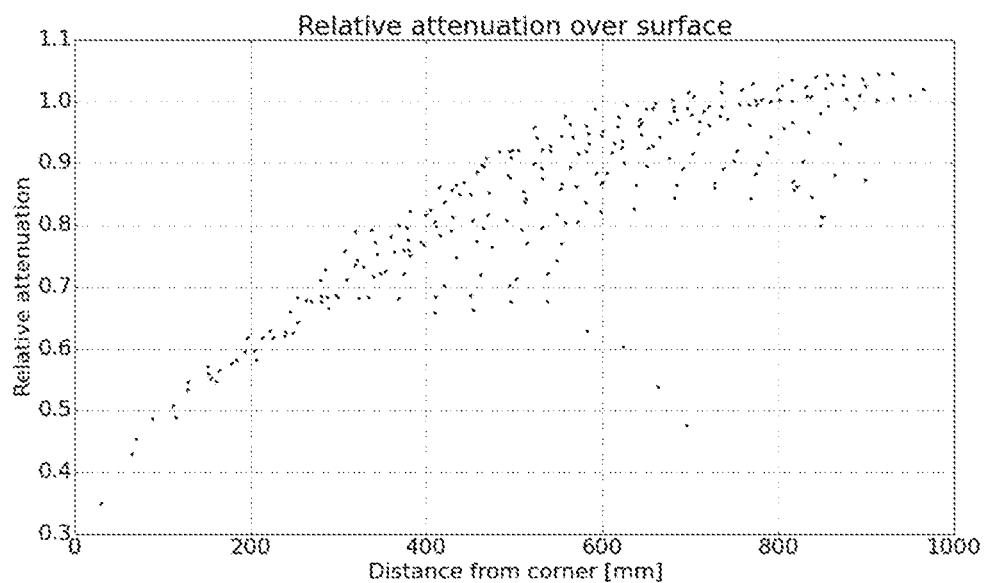
FIG. 11 is a graph showing measured attenuation of light beams by an object in proportion to the object's distance from a corner of the touch surface.

In certain arrangements of the system shown FIG. 1, certain positions on the touch surface are likely to result in lower attenuation values than others. In particular, attenuation values towards the edge of the screen are likely to be lower than in the centre. A variety of factors may cause this to be the case. One is that efficient implementations of certain tomographic reconstruction algorithms make approximations resulting in lower reconstructed attenuation values towards the edges of the panel. In one example, attenuation values in a corner of a panel may be as low as 30% of attenuation values located at the centre of the panel. FIG. 11 shows a graph of attenuation values (shown as relative attenuation) of an object touching a rectangular touch surface relative to the distance of the object from a corner of the touch surface. Consequently, a preferred embodiment of the invention provides that the compensation value is a function of at least the position of the object on the touch surface. In one embodiment, the compensation value is determined as a function of the distance from a central point on the touch surface to the touch position. Alternatively, the compensation value may be determined as a function of the distance from the nearest corner of the touch surface to the touch position.

Figure 12:
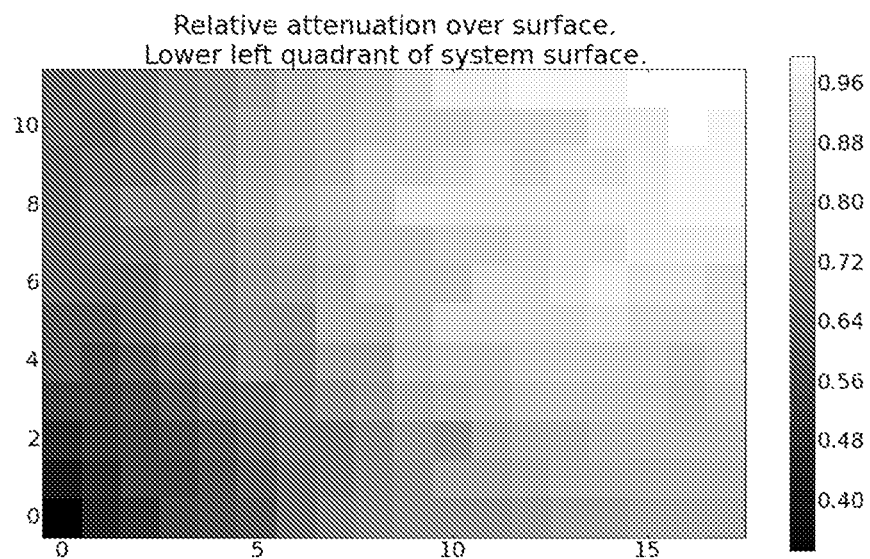
FIG. 12 is an attenuation map showing the relative attenuation of an object at each location on a corner portion of the touch surface.

The relationship between the position of the touch and a required compensation value may be a complex function of the geometry of the emitters and detectors. FIG. 12 shows a heat map of a corner of a rectangular touch surface showing relative attenuation of a touching object. When touching at co-ordinate (0,0), the object generates relatively little attenuation. When touching at co-ordinate (10,15), a much larger amount of attenuation occurs.

Consequently, a preferred embodiment of the invention provides calculating a compensation value as a function of the position of the corresponding touch on the touch surface. An alternative embodiment describes using a compensation map to determine a compensation value given a position on the touch surface. The compensation map may comprise a 2D image corresponding to the dimensions of the touch surface with pixel values corresponding to compensation values. A touch position is then used to determine the corresponding pixel on the compensation map and the pixel value at that position provides the corresponding compensation value. In a preferred embodiment, the compensation map has a resolution lower than or equal to the touch resolution of the touch determination system. The compensation map is preferably generated in advance but may also be generated dynamically as a function of environmental and performance variables.

The signal processor 130 may be configured to determine the compensation value at a position on the compensation map by interpolation in the x- and y-direction of the compensation map between pre-defined compensation values in the compensation map. Thus, it is possible to have a coarse grid of compensation values, and subsequently use interpolation over the coarse grid to obtain the compensation values at a particular coordinate.

The compensation value may be determined for each position in a grid of positions where the resolution of the compensation map is determined by the pitch of the grid, i.e. the dimensions of a cell in the grid. The pitch may vary as a function of the position in the compensation map. For example, bi-linear interpolation in a coarse grid, i.e. higher pitch, may work well in the center of the map, but near the edges and especially corners the pitch is may advantageously be decreased to correctly capture the attenuation variation.

Figure 13:
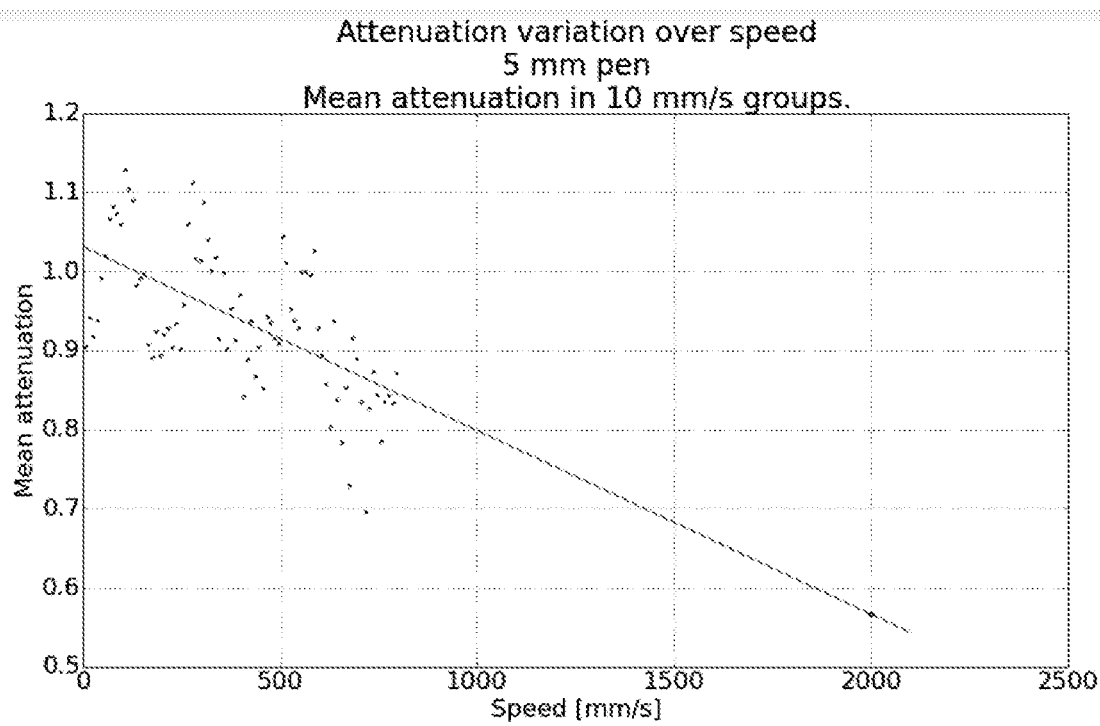
FIG. 13 is a graph showing measured attenuation of light beams by an object in proportion to speed at which the object is moving across the touch surface.

Another variable which may affect the recorded attenuation of a touch object is the speed at which the touching object is moving across the touch surface. The light attenuation of each light path is recorded sequentially over a series of frames. Therefore, a sufficiently fast moving object may have moved away from a specific position before the attenuation of all light paths intersecting the position have been measured. Consequently, a moving object may generate a weaker attenuation signal. FIG. 13 shows a graph of recorded attenuation values of an object relative to the speed of the object across the touch surface. A relationship can be seen showing that a faster moving object is likely to generate a weaker attenuation value. Therefore, a preferred embodiment of the invention provides calculating an attenuation value in dependence on a compensation value which is determined at least as a function of the speed of the object across the touch surface.

As the relationship between the speed of an object and the recorded attenuation value may also be complicated by the position of the moving object on the touch surface, an embodiment of the invention provides determining a compensation value as a function of both the position and speed of the object on the touch surface.

The compensation value may be a function of the depth of the light field ($h_{max}$). This provides for improving the classification of different objects used simultaneously. For example, if a cone-shaped stylus tip is used, the attenuation will be affected by the current lightfield height to a larger extent than a tip having a uniform thickness in the longitudinal direction. Thus, by compensating for the lightfield height differences, it will be easier to distinguish between styluses having different tips, since the influence of the field height is minimized.

The signal processor 130 may be configured to determine the depth of the light field ($h_{max}$) based on the output signals of the light detectors 30b. A more warped touch surface 20, i.e. being more concave in the direction towards the user of the touch surface, may provide an increase in the signal strength detected by the light detectors 30b. Increased warp is also associated with increased height of the lightfield.

Thus, by having the signal processor 130 configured to detect an increase or decrease of the output signal in response to touch surface warp, the height of the lightfield can be estimated. The estimate of the lightfield height may then be used as an input to the lightfield height compensation discussed above.

Figure 14:
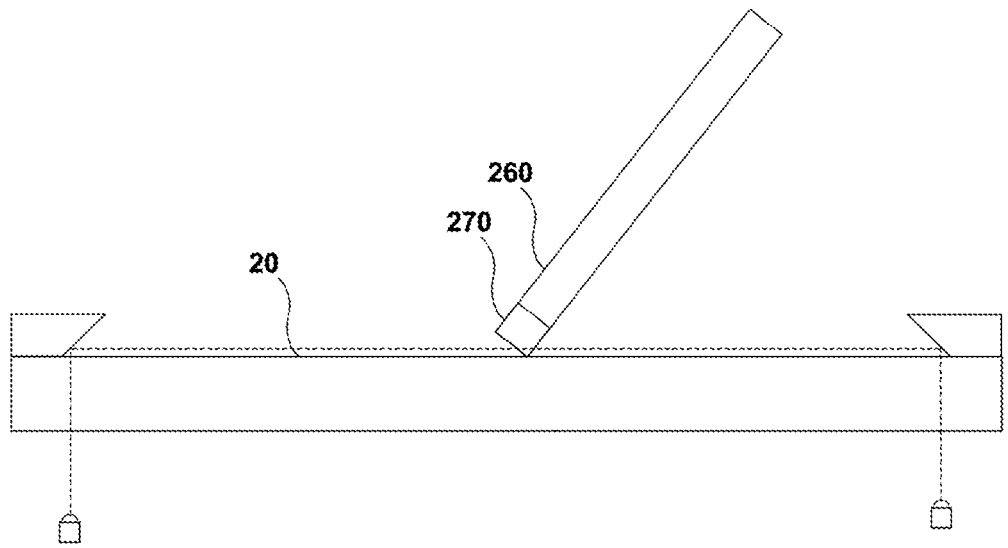
FIG. 14 shows a cross-section of a stylus having a flat end being applied to a touch surface.
Figure 15:
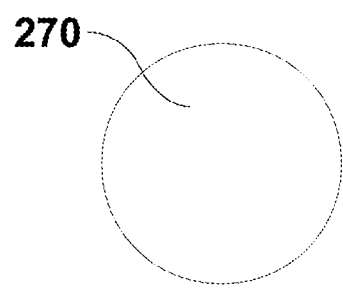
FIG. 15 shows an end view of the stylus from FIG. 14.
Figure 16:
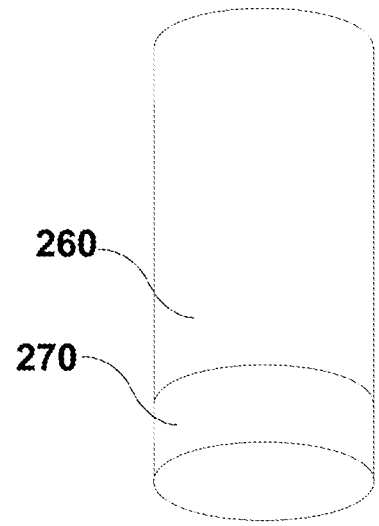
FIG. 16 shows a tilted view of the stylus from FIG. 14.
Figure 17:
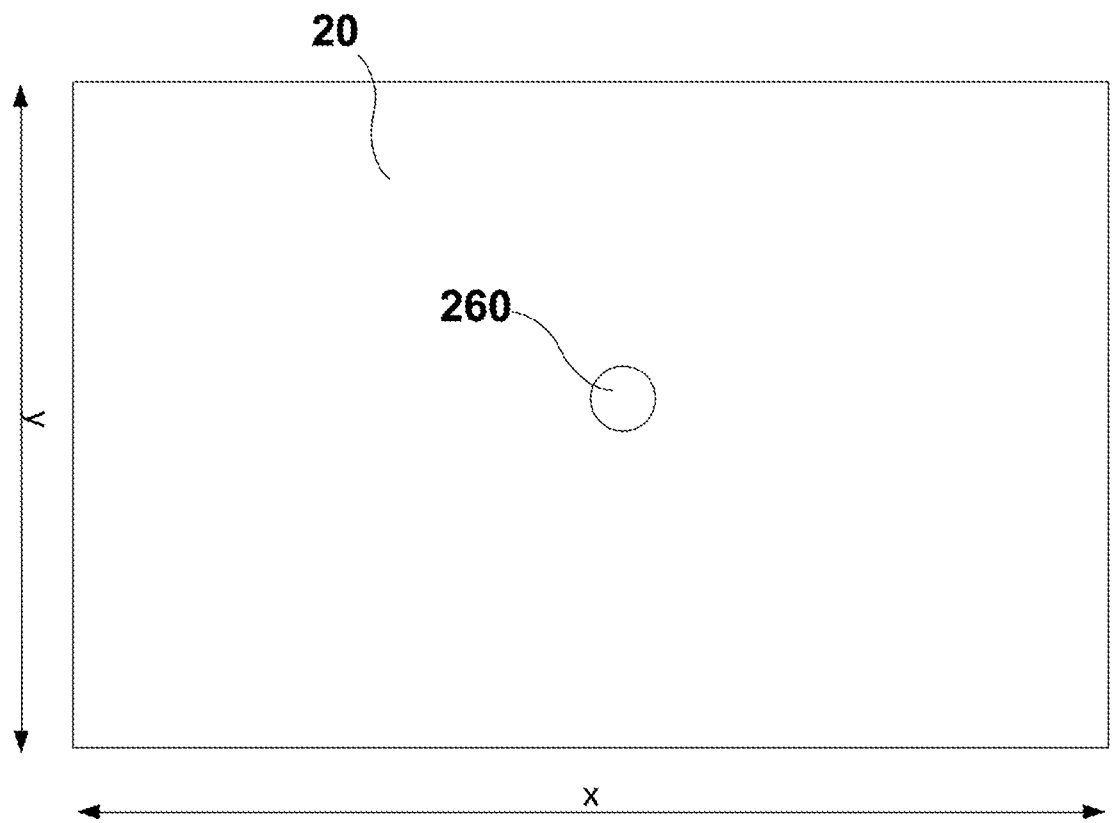
FIG. 17 is a top plan view of an optical touch apparatus with the stylus of FIG. 14 applied to the touch surface without any tilt from the normal of the touch surface.
Figure 18:
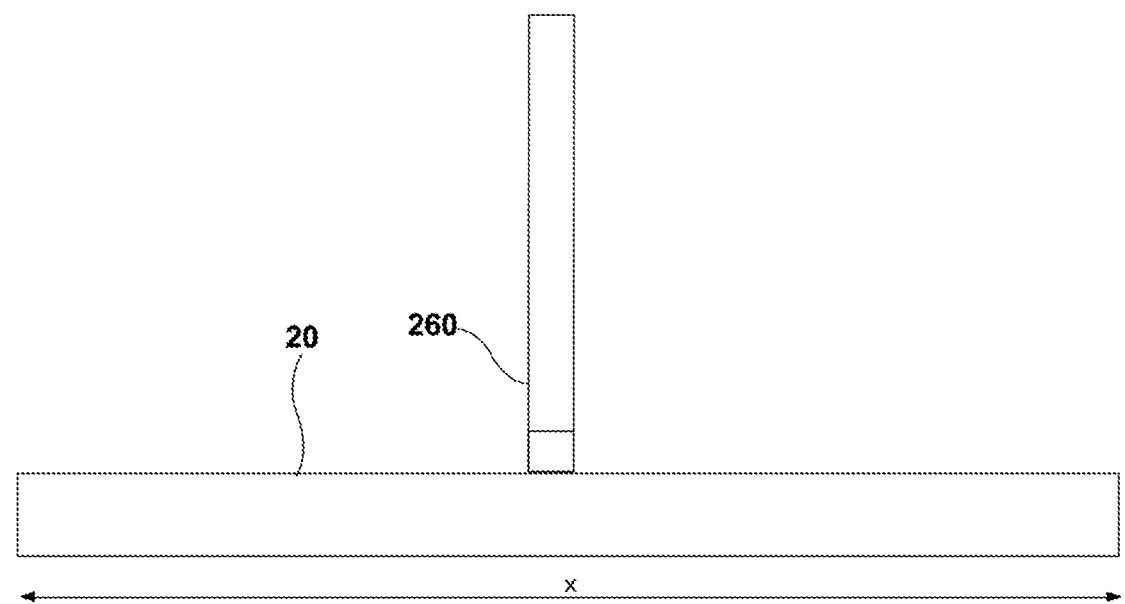
FIG. 18 is a cross-section of the arrangement shown in FIG. 17 showing the x-axis.
Figure 19:
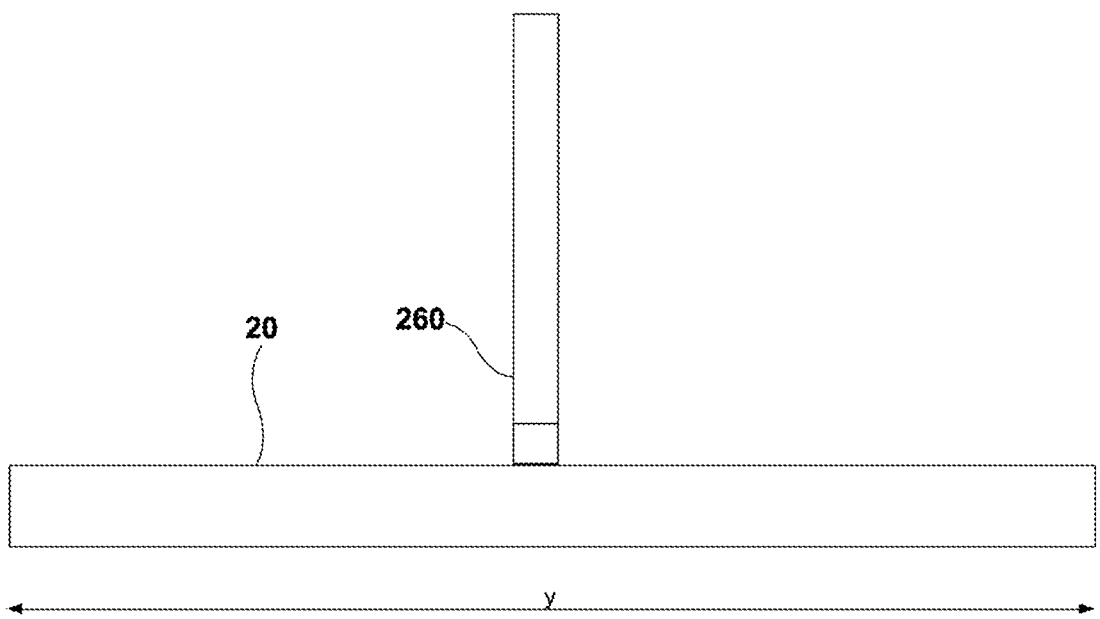
FIG. 19 is a cross-section of the arrangement shown in FIG. 17 showing the y-axis.

Another factor which may affect the light attenuation resulting from an object touching the touch surface is the shape of the object tip and the angle at which the tip is applied to the touch surface 20. FIG. 14 shows a flat ended stylus 260 with a rounded cross-section. FIG. 15 and FIG. 16 show stylus 260 having a flat ended tip 270 from an end-on and a tilted end-on perspective respectively. FIG. 17 shows a top-down perspective of flat ended stylus 260 as applied to the touch surface 20 without any angle of tilt relative to the normal of the touch surface. FIG. 18 and FIG. 19 show flat ended stylus tip 270 as viewed along the y and x-axis of surface 20 respectively. It is clear that the profile of flat ended stylus tip 270 is the same as viewed along the x-axis as when viewed along the y-axis. Therefore, light paths travelling along a path closely parallel to the x-axis (e.g. light paths originating from the left edge of the touch surface 20 from FIG. 17 and finishing on the right edge of the touch surface) intersecting with the object are likely to be attenuated to a similar degree as those light paths travelling along a path closely parallel to the y-axis (e.g. light paths originating from the bottom edge of the touch surface 20 from FIG. 17 and finishing on the top edge of the touch surface). The transmission values of said light paths will be affected accordingly.

Figure 20:
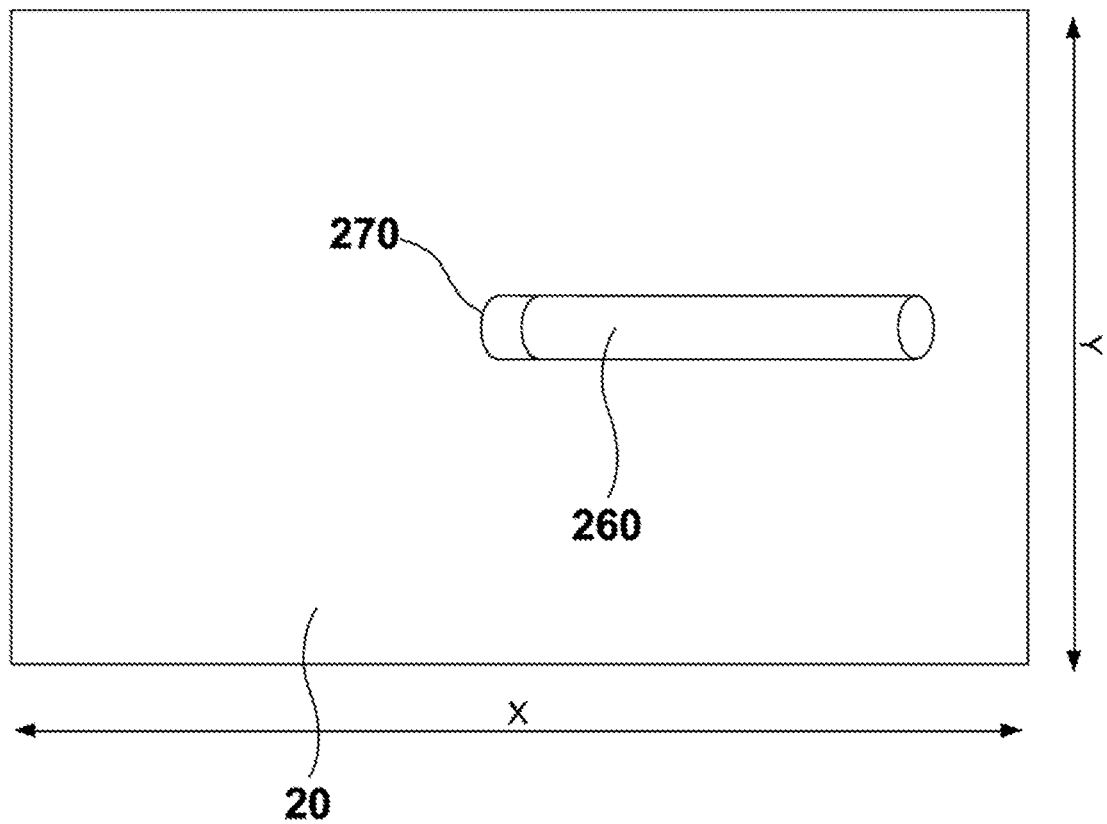
FIG. 20 is a top plan view of an optical touch apparatus with the stylus of FIG. 14 applied at an angle from the normal of the touch surface.
Figure 21:
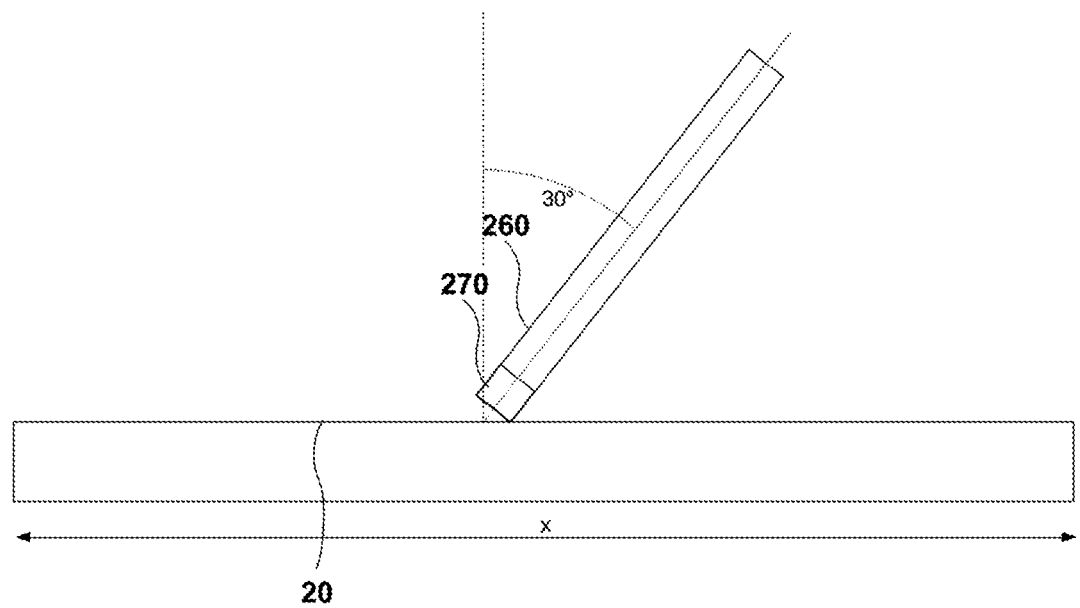
FIG. 21 is a cross-section of the arrangement shown in FIG. 20 showing the x-axis.
Figure 22:
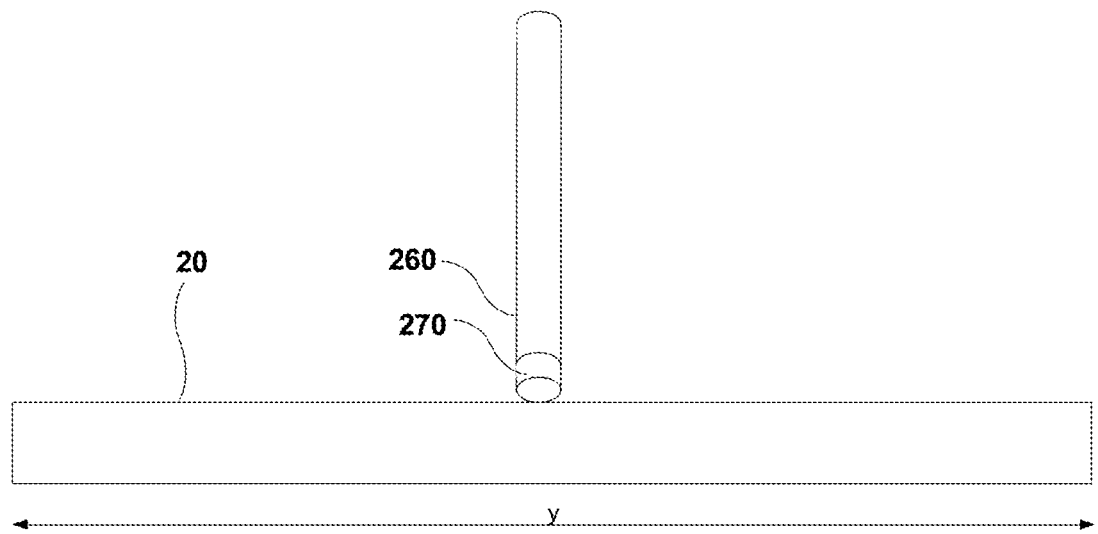
FIG. 22 is a cross-section of the arrangement shown in FIG. 20 showing the y-axis.

However, as we can see from FIGS. 20 to 22, this changes when stylus object 260 is tilted relative to the normal of the touch surface. The profile of the stylus tip 270 along the y-axis in FIG. 21 is different to the profile of stylus tip 270 along the x-axis in FIG. 22.

Figure 23:
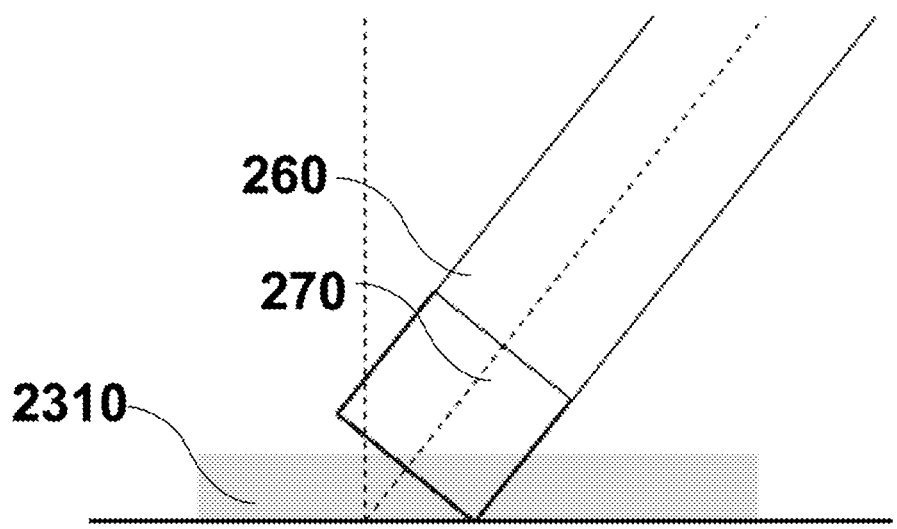
FIG. 23 is a zoomed view of FIG. 21 showing a cross-section of the light field along a single light path and the area of the light blocked by the stylus tip.

FIG. 23 is a zoomed view of FIG. 21. In the zoomed view, light field 2310 of a light path between a single emitter and detector is shown. In this cross-section, stylus tip 270 blocks a portion of the light field 2310. This will be seen as an attenuation of the light signal recorded by the detector and a drop in the corresponding transmission value. In FIG. 23, the area of the light field blocked by the side profile (i.e. the profile of the stylus tip as viewed along of the y-axis) of the stylus tip is around 10%.

Figure 24:
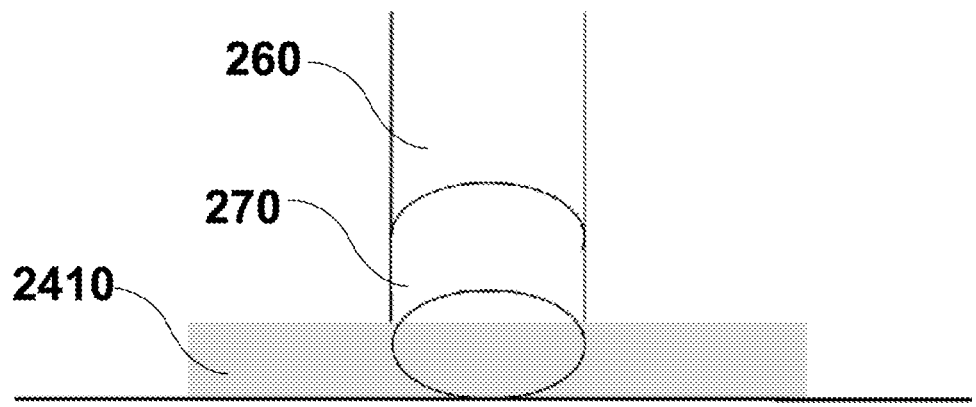
FIG. 24 is a zoomed view of FIG. 22 showing a cross-section of the light field along a single light path and the area of the light blocked by the stylus tip.

FIG. 24 is a zoomed view of FIG. 22 similar to FIG. 23 but as viewed in a direction along the x-axis. In this direction, a rounded profile of the stylus tip 270 is seen. In this cross-section, stylus tip 270 blocks a larger portion of the light field 2410. In FIG. 24, the area of the light field 2410 blocked by the side profile (i.e. the profile of the stylus tip as viewed along the y-axis) of the stylus tip is around 25%.

Figure 25:
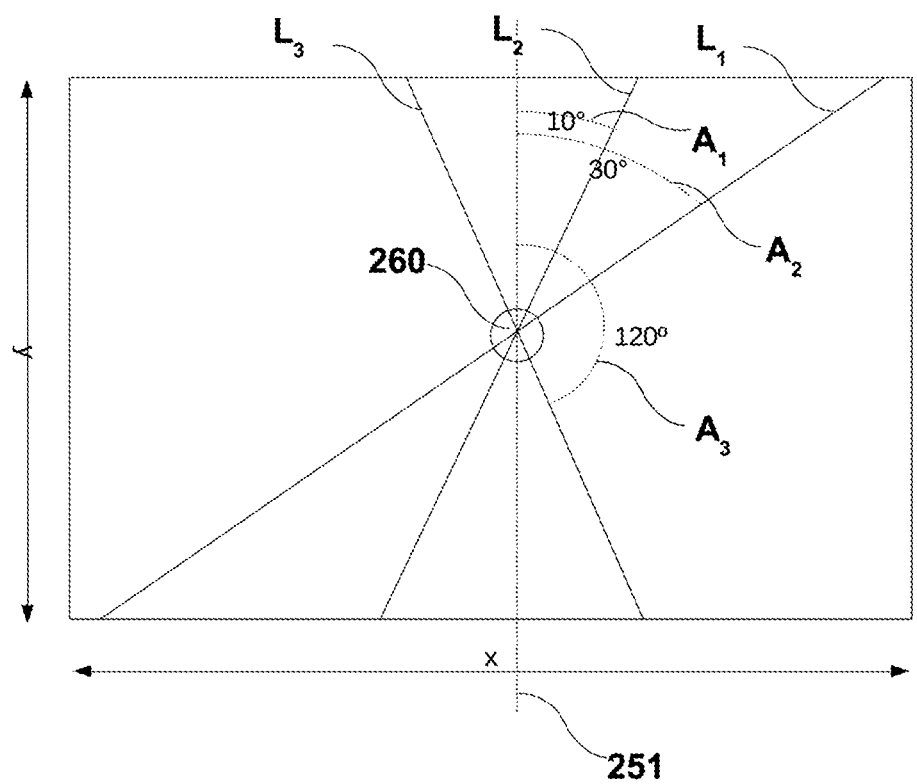
FIG. 25 is a top plan view of a stylus tip being applied to a touch surface.

FIG. 25 is a top plan view of stylus tip 270 being applied to a touch surface 20. Detection lines L1, L2, and L3 are a subset of detection lines 50 which intersect with the contact point between the touch surface 20 and the stylus tip 270 and are therefore attenuated by the stylus. This angle of a detection line relative to vertical line 251 is defined as phi. Angles A1, A2, and A3 are the angles of the detection lines L1, L2, and L3 respectively relative to vertical line 251 respectively.

Figure 26:
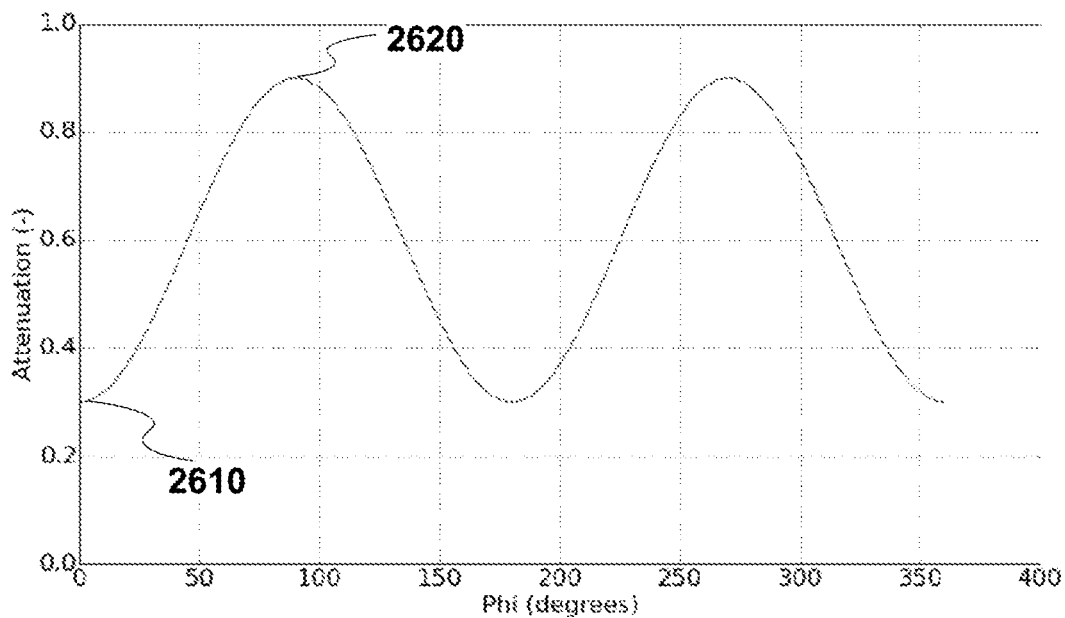
FIG. 26 is a graph showing attenuation of light along different light paths by a particular stylus tip.

For a system having a large number of emitters and detectors, a number of detection lines are likely to intersect stylus tip 270. FIG. 26 is a graph showing transmission values for different light paths intersected by the stylus tip of FIG. 21 relative to the angle phi of the light path. Minimum 2610 and maximum 2620 show minimum and maximum transmission values caused by the stylus tip across the full range of phi. For stylus tip 270, the minimum transmission value is likely to correspond to the light path 2410 shown in FIG. 24 and the maximum transmission value is likely to occur for the light path 2310 shown in FIG. 23, especially if the light paths have approximately 90 degrees of separation in phi. By measuring a ratio between the minimum and maximum transmission values of the light paths, the angle of the stylus from the normal of the touch surface maybe determined. The larger the ratio, the larger the tilt of the stylus from the normal. The closer the ratio is to 1:1, the closer the stylus axis is to the normal of the touch surface.

Therefore, in a preferred embodiment of the invention, the signal processor 130 is configured to determine the angle of an axis of a stylus relative to the normal of the touch surface in dependence on a ratio between the minimum amount of attenuation and maximum amount of attenuation for the light paths intersecting the stylus.

Figure 28:
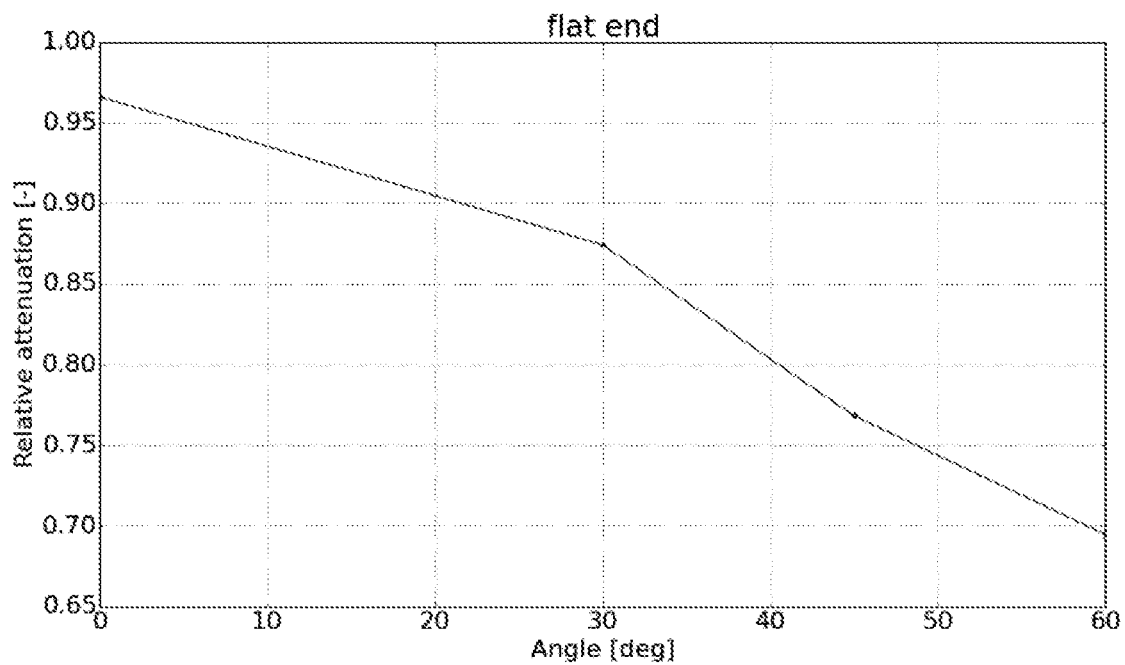
FIG. 28 is a graph showing attenuation of a flat ended stylus tip relative to the angle at which the stylus is applied to the touch surface.

FIG. 28 is a graph showing an example of the measured attenuation of stylus tip 270 relative to the angle at which it is applied to the touch surface of an embodiment according to FIG. 2. As the angle relative to the normal of the touch surface increases, the attenuation value decreases. For a known stylus tip (such as that shown in FIG. 23), the angle of the axis of the stylus from the normal of the touch surface may be determined from the graph given the attenuation value of the stylus tip.

Furthermore, once the phi angles of detection lines having the minimum and maximum transmission values are identified, it is possible to determine the direction that the stylus is pointing in the phi plane. As the profile shown in FIG. 24 is likely to be responsible for the maximum attenuation and the lowest transmission value 2610, it can be determined that the stylus is likely pointed at an angle from the normal of the touch surface and in the same direction of the light path 2410 or 180 degrees to it. i.e. The minimum transmission value of FIG. 26 is located at 90 degrees (as well as 270 degrees) in phi and the maximum is located at 180 degrees (as well as 0 degrees). Therefore, it can be determined that the stylus is tilted away from the normal of the touch surface at an angle determined by the ratio between the minimum and maximum transmission values, and at an angle of 90 degrees or 270 degrees in the phi plane (as in FIG. 20).

Figure 27:
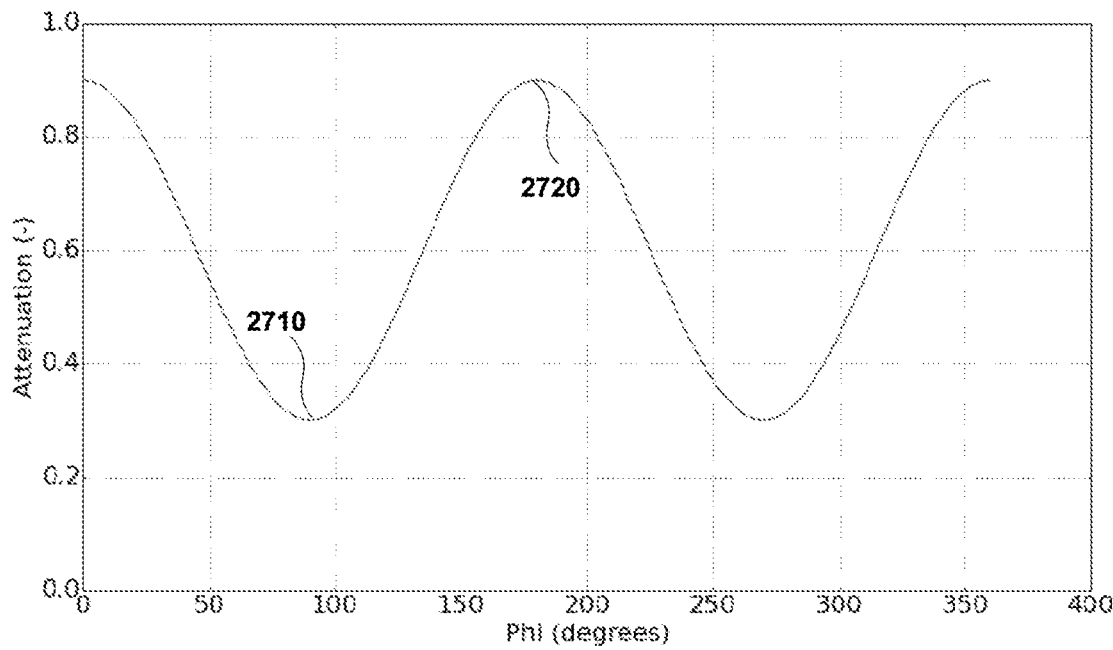
FIG. 27 is a graph showing attenuation of light along different light paths by a particular stylus tip orientated in a different direction to that of FIG. 26.

In FIG. 27, the minimum transmission value of FIG. 26 is located at the 60 degrees (as well as 240 degrees) and the maximum transmission value is located at 150 degrees (as well as 330 degrees). Therefore, the stylus can be determined to be tilted in a direction of 60 degrees or 240 degrees in the phi plane. Consequently, a preferred embodiment of the invention provides determining the direction of a tilt of a stylus in the phi plane as a function of the phi value of the light path with the minimum amount of attenuation and the phi value of the light path having the maximum amount of attenuation. In an alternative embodiment, just the phi value of the light path having the maximum amount of attenuation is used to determine the orientation of a tilt of a stylus in the phi plane.

In one embodiment, information on the user's left or right handedness is used to select between which phi value to use to determine tilt orientation, due to the difference in typical stylus tilt orientation between left and right handed users. E.g. For FIG. 26, signal processor 130 is configured to determine that the stylus is orientated at a phi of 90 degrees for a right handed user and 270 degrees for a left handed user.

Figure 29:
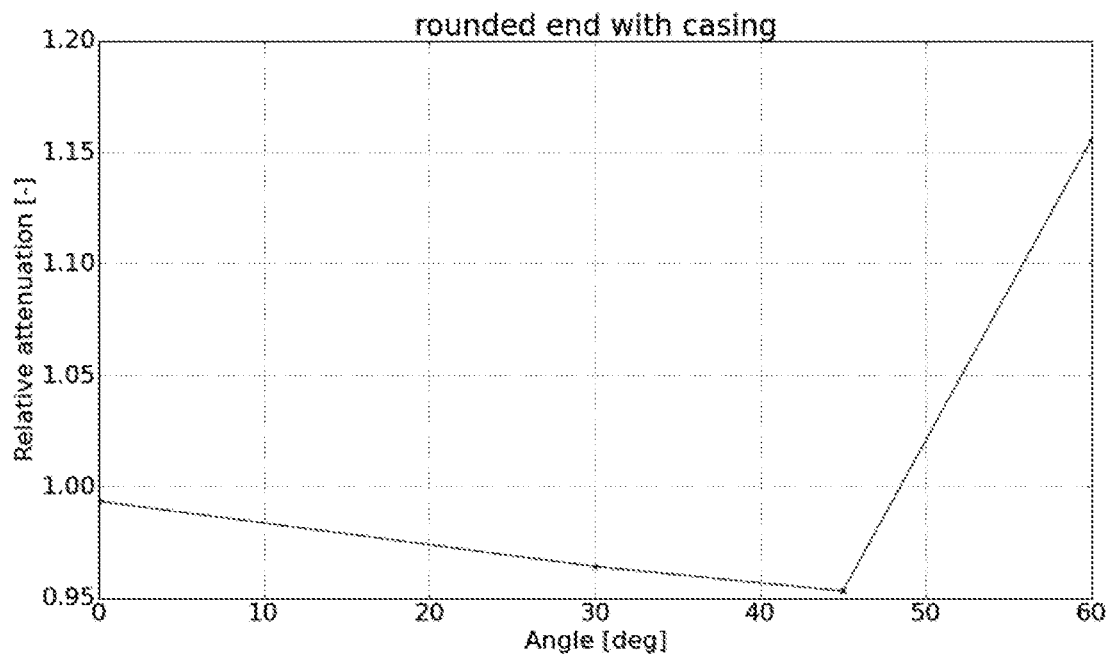
FIG. 29 is a graph showing attenuation of a dome ended stylus tip relative to the angle at which the stylus is applied to the touch surface.
Figure 30:
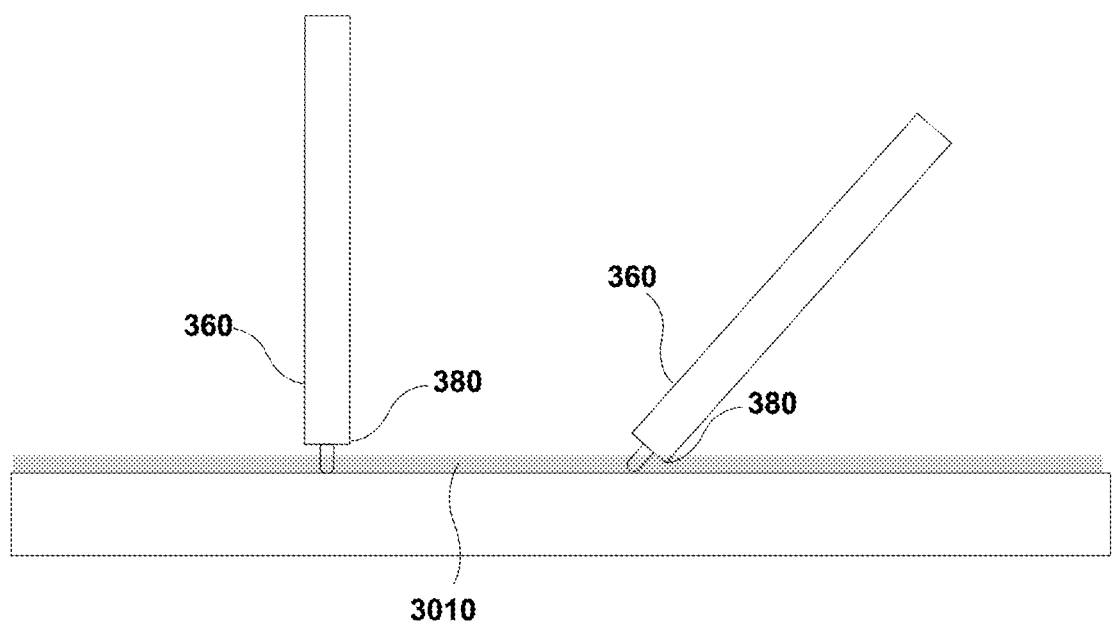
FIG. 30 shows a dome ended stylus tip applied to a touch surface.

In one embodiment, the signal processor 130 is configured to determine that a tilt angle of the stylus relative to the normal of the touch surface has exceeded a threshold if the attenuation value begins to increase again whilst the ratio between the minimum and maximum transmission values remains high. Such a signal output would likely be caused by the stylus being tilted at such an angle to the normal of the touch surface that a section of the stylus casing has entered the light field and is having an effect on the attenuation value. FIG. 29 shows a graph of attenuation relative to the stylus angle in such a scenario. FIG. 30 shows the casing 380 of stylus 360 entering the light field 3010 and increasing the attenuation value.

The object touching the touch surface 20 may be a stylus 60, which may have a distal stylus tip 400 comprising a spherically-shaped portion 410, as illustrated in FIGS. 31a-c. By having a spherically-shaped portion 410 the attenuation in the lightfield can be kept substantially constant when the stylus 60 is tilted. This is due to the symmetry of the spherical shape of the distal stylus tip 400, which does not change when the stylus is tilted. This will keep the effective width of the object as constant as possible, when tilted in various angles, which in turn makes it easier to distinguish several simultaneously used objects. For example, a plurality of different styluses 60 may be used simultaneously, where the dimensions of each stylus tip may be associated with particular stylus properties when used on the touch surface, such as varying drawing tools and colors. The spherically-shaped portion 410 may be a sphere that is arranged on a thin distal extension 411 that connects the sphere 410 with the remainder of the stylus 60. Reducing the cross-sectional dimension of the distal extension 411 will also minimize the variation of the attenuation when the stylus 60 is tilted, in particular when tilting the stylus with larger angles, since the area of the distal extension 411 in the lightfield will be minimized.

Figures 32A, 32B:
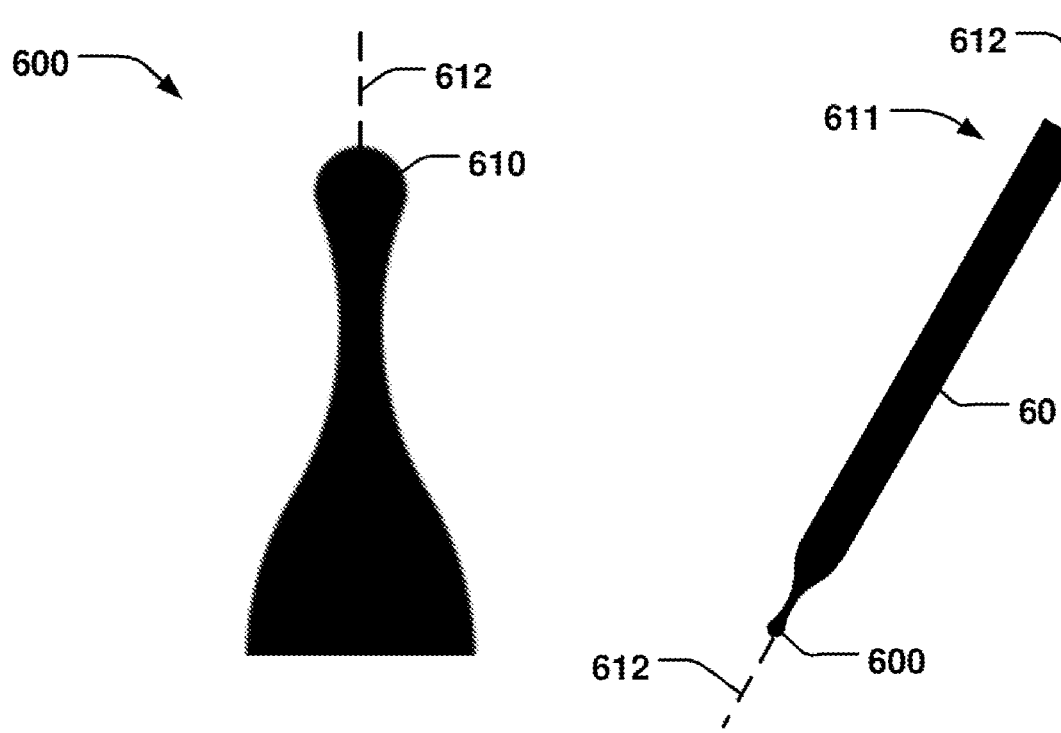
FIGS. 32a-c show a stylus tip having a drop-shaped portion.
Figure 32C:
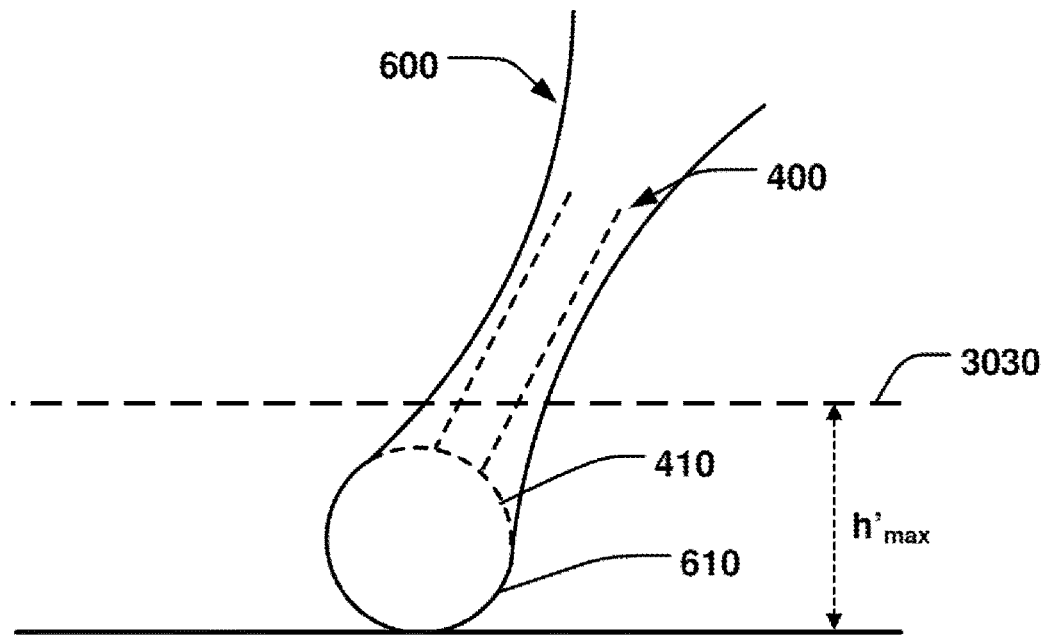

FIG. 31c illustrates two different lightfields 3020 and 3030, having different heights $h_{max}$ and $h'_{max}$, respectively. When the height of the lightfield is higher than the spherically-shaped portion 410, which is the case with lightfield 3030, it may be advantageous to have a drop-shaped stylus tip 600 to increase the attenuation. FIGS. 32a-c illustrate an object 60 having a distal stylus tip 600 comprising a drop-shape 610, 620, that tapers towards a proximal end 611 of the object 60, opposite the distal stylus tip 600, along a longitudinal object axis 612. Thus, the drop-shape narrows gradually in the longitudinal direction 612 towards the proximal end 611 of the stylus 60. FIG. 32c illustrates the different cross-sections of the distal tips 400 and 600 in a high lightfield 3030. The drop-shaped tip 610 adds more area in the upper part of the lightfield compared to the spherically-shaped portion 410, which increases the attenuation. The drop-shape 610 minimizes at the same time the effective width increase when the stylus 60 is tilted.

Figure 33A:
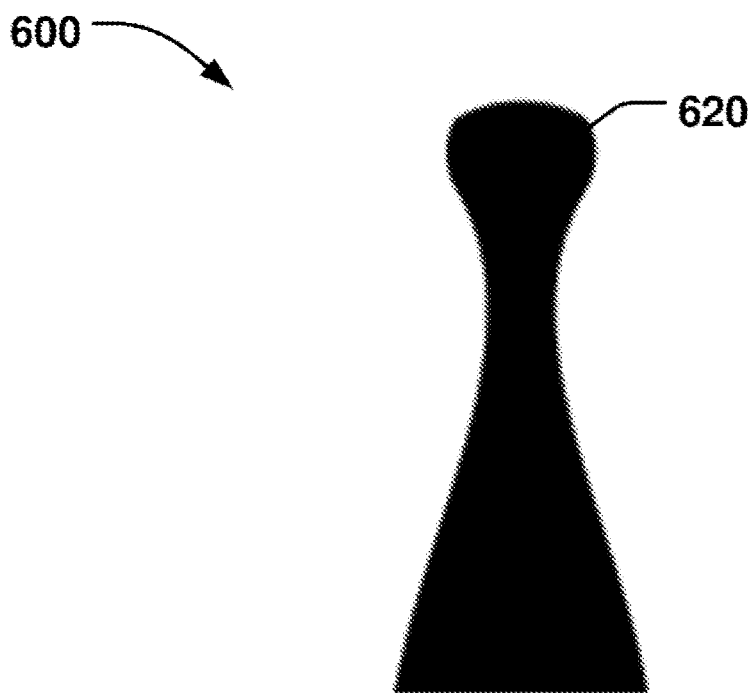
FIGS. 33a-b show a stylus tip having another drop-shaped portion.
Figure 33B:
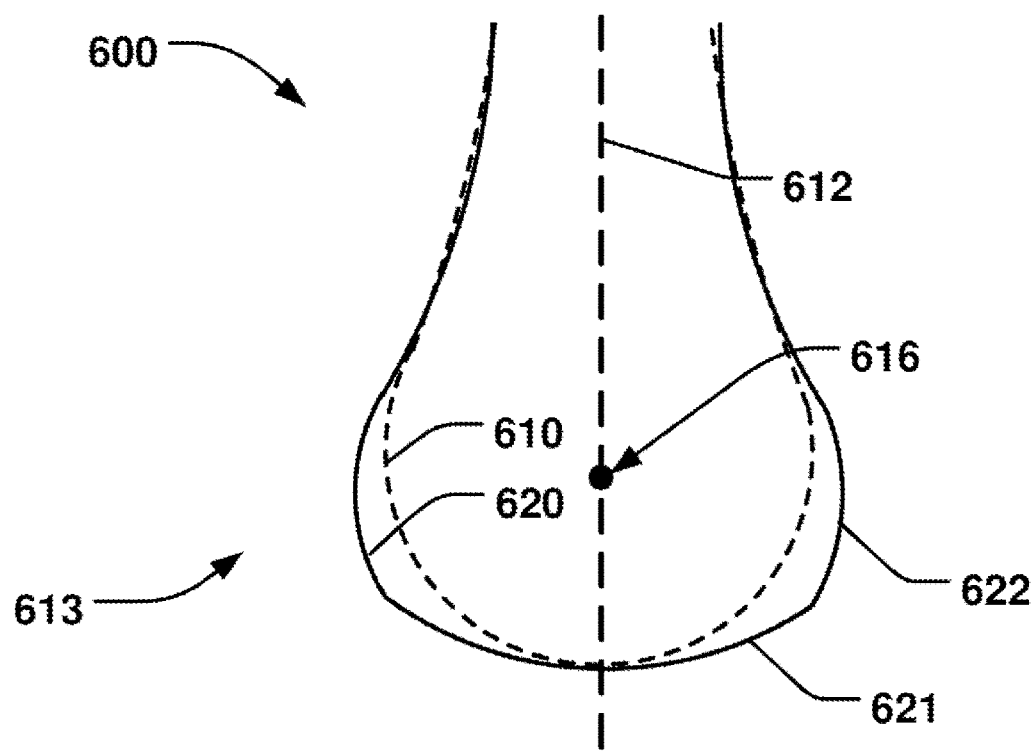
Figure 34:
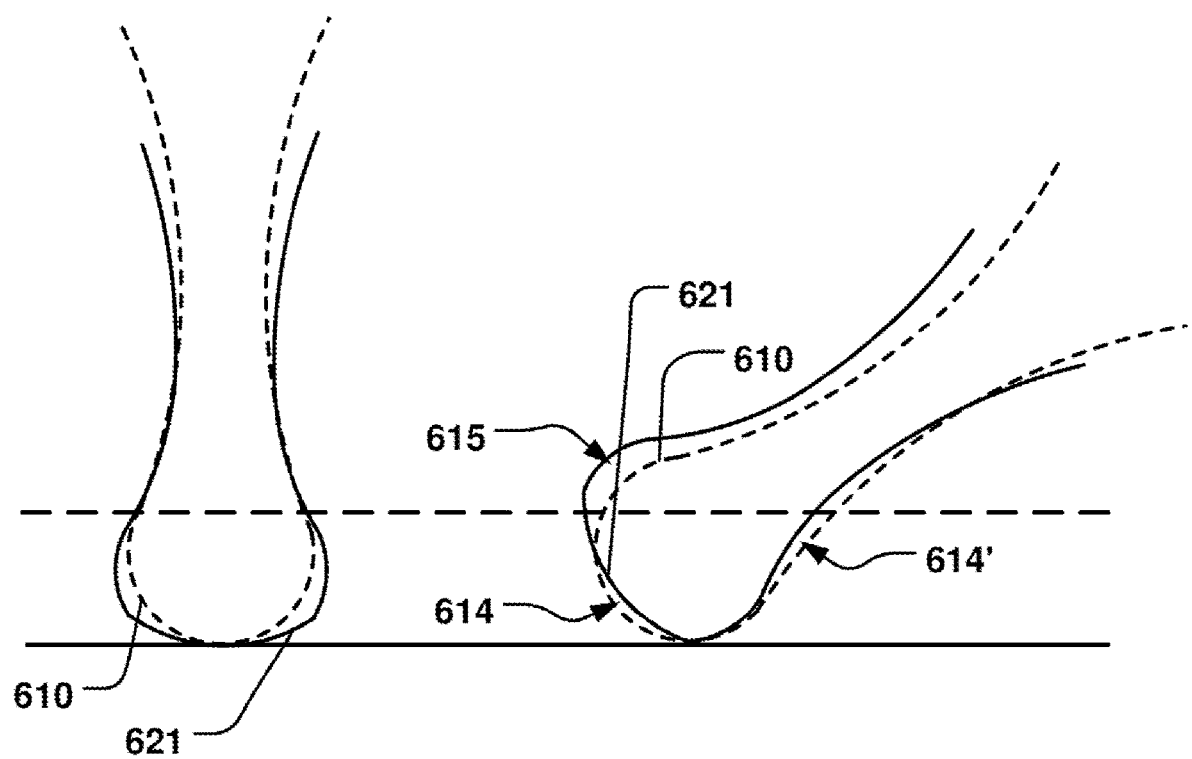
FIG. 34 show a stylus tip having two different drop-shaped portions, in a vertical and tilted configuration.

FIGS. 33a-b illustrate another drop-shaped stylus tip 600. The drop-shape may comprise an at least partly spherical surface 613. The at least partly spherical surface 613 may comprise a distal base portion 621 intersecting the longitudinal object axis 612 and having rotational symmetry around the same. The at least partly spherical surface 613 may further comprise an annular side 622, arranged proximally of the distal base portion 621, and defining the maximum circumference of the partly spherical surface 613 around the longitudinal object axis 612. The annular side 622 has rotational symmetry around the longitudinal object axis 612. The distal base portion 621 has a larger radius of curvature than the annular side 622, with respect to an imaginary circle center of a circle lying in a plane which is parallel to the longitudinal object axis 612. Since the distal base portion 621 has a larger radius of curvature than the side 622, i.e. being more flat or less convex towards a mass center point 616 of the distal tip 600, a part of the volume of the distal tip 600 will be shifted to a location above the light field when the distal tip 600 is tilted. This is schematically illustrated in FIG. 34, where parts of the volume that are shifted are denoted as 614, 614', when comparing to the distal tip 610 which has a distal base portion which has smaller radius of curvature. The shifted volume 614, 614', is instead positioned above the light field at 615. Thus, this compensates for the added volume of the proximal portion that enters the light field when the stylus is tilted. The drop-shape 620 thus improves the functionality in high lightfields while keeping the effective width of the object as constant as possible.

The invention claimed is:

1. A touch sensing apparatus, comprising:
a touch surface,
a set of emitters arranged around the periphery of the touch surface to emit beams of light such that an object touching the touch surface causes an attenuation of the light;
a set of light detectors arranged around the periphery of the touch surface to receive light from the set of emitters on a plurality of light paths, wherein each light detector is arranged to receive light from more than one emitter; and
a signal processor configured to:
determine, based on output signals of the light detectors, a light energy value for each light path;
generate a transmission value for each light path based on the light energy value;
operate an image reconstruction algorithm on at least part of the thus-generated transmission values so as to determine:
a position of the object on the touch surface, and
an attenuation value corresponding to the attenuation of the light resulting from the object touching the touch surface, and
determine a type of the object in dependence on the attenuation value,
wherein the determination of the type of the object is not performed by the signal processor until the attenuation value is determined to be stable,
wherein the attenuation value of an object is determined to be stable once it has not changed greater than 10% each frame for a plurality of frames.

2. The touch sensing apparatus of claim 1, wherein the image reconstruction algorithm is an algorithm for transmission tomography.

3. The touch sensing apparatus of claim 1, further comprising a light transmissive panel defining the touch surface and an opposite surface, wherein the emitters are configured to introduce light into the panel for propagation by internal reflection between the touch surface and the opposite surface, and the detectors are configured to receive the light propagating in the panel.

4. The touch sensing apparatus of claim 1, wherein the emitters are configured to transmit the beams of light above the touch surface and the detectors are configured to receive said beams of light travelling above the touch surface.

5. The touch sensing apparatus of claim 4, wherein the beams of light transmitted by the emitters and received by the detectors extend no further than 5 mm from the touch surface.

6. The touch sensing apparatus of claim 1, wherein a determination of an interaction area between an object and touch surface is determined in dependence on the attenuation value.

7. The touch sensing apparatus of claim 1, the signal processor further configured to store a plurality of object IDs, each having an associated attenuation value range.

8. The touch sensing apparatus of claim 7, the signal processor further configured to identify an object ID with an attenuation value range corresponding to the attenuation value of the object and associating the object ID with the object.

9. The touch sensing apparatus of claim 1, the attenuation value is generated in dependence on the attenuation of the light resulting from the object touching the touch surface and a compensation value.

10. The touch sensing apparatus of claim 9, wherein the compensation value is a function of at least the position of the object on the touch surface.

11. The touch sensing apparatus of claim 9, the compensation value being the value at a position on a compensation map corresponding to the position of the object on the touch surface.

12. The touch sensing apparatus of claim 9, wherein object has an object axis and wherein the compensation value is a function of at least an angle of the object axis relative to the normal of the touch surface.

13. The touch sensing apparatus of claim 12, wherein object has a flat end and wherein the angle of the object axis relative to the normal of the touch surface is determined as a function of the transmission value and geometry of each light path intersecting with object.

14. The touch sensing apparatus of claim 12, wherein the angle of the object axis relative to the normal of the touch surface is determined as a function of the ratio between the minimum amount of attenuation and maximum amount of attenuation for the light paths intersecting the stylus.

15. The touch sensing apparatus of claim 9, wherein the compensation value is a function of at least the speed of the object across the touch surface.

16. The touch sensing apparatus of claim 15, wherein the compensation value is proportional to the speed of the object across the touch surface.

17. The method of claim 1, wherein the plurality of frames comprise at least 3 frames.

18. A method of determining a type of object in contact with a touch surface of a touch sensing apparatus, said touch sensing apparatus comprising:
a touch surface,
a set of emitters arranged around the periphery of the touch surface to emit beams of light such that an object touching the touch surface causes an attenuation of the light;
a set of light detectors arranged around the periphery of the touch surface to receive light from the set of emitters on a plurality of light paths, wherein each light detector is arranged to receive light from more than one emitter; and
said method comprising the steps of:
determining, based on output signals of the light detectors, a light energy value for each light path;
generating a transmission value for each light path based on the light energy value;
operating an image reconstruction algorithm on at least part of the thus-generated transmission values so as to determine;
a position of the object on the touch surface, and
an attenuation value corresponding to the attenuation of the light resulting from the object touching the touch surface, and
determining a type of the object in dependence on the attenuation value,
wherein the determination of the type of the object is not performed by the signal processor until the attenuation value is determined to be stable,
wherein the attenuation value of an object is determined to be stable once it has not changed greater than 10% each frame for a plurality of frames.

19. The method of claim 18, wherein the plurality of frames comprise at least 3 frames.

* * * * *